(12) United States Patent
Yamamoto et al.

(10) Patent No.: US 7,555,129 B2
(45) Date of Patent: Jun. 30, 2009

(54) CONTENT PLAYBACK APPARATUS, CONTENT PLAYBACK METHOD, AND PROGRAM

(75) Inventors: Masaya Yamamoto, Arcadia, CA (US); Motoji Ohmori, Hirakata (JP); Masato Yamamichi, Kodama (JP); Masami Yamamichi, legal representative, Ota (JP); Satomi Yamamichi, legal representative, Ota (JP); Keiko Yamamichi, legal representative, Maebashi (JP); Kazuhisa Watanabe, Yokohama (JP); Atsushi Saso, Yokohama (JP); Naoaki Yamamoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 645 days.

(21) Appl. No.: 10/868,872

(22) Filed: Jun. 17, 2004

(65) Prior Publication Data

US 2005/0018854 A1 Jan. 27, 2005

(30) Foreign Application Priority Data

Jun. 18, 2003 (JP) ............................. 2003-173908

(51) Int. Cl.
*H04L 9/00* (2006.01)
(52) U.S. Cl. .................... 380/277; 380/54; 380/200; 380/210; 713/193; 726/27
(58) Field of Classification Search ................. 380/277
See application file for complete search history.

(56) References Cited

U.S. PATENT DOCUMENTS

| | | | |
|---|---|---|---|
| 5,796,839 A * | 8/1998 | Ishiguro | 380/44 |
| 5,825,876 A * | 10/1998 | Peterson, Jr. | 705/52 |
| 6,438,235 B2 * | 8/2002 | Sims, III | 380/285 |
| 7,225,339 B2 * | 5/2007 | Asano et al. | 713/193 |
| 2001/0033656 A1 * | 10/2001 | Gligor et al. | 380/28 |
| 2002/0012430 A1 | 1/2002 | Lim | |
| 2002/0076204 A1 | 6/2002 | Nakano et al. | |

(Continued)

FOREIGN PATENT DOCUMENTS

EP 1 185 022 3/2002

(Continued)

OTHER PUBLICATIONS

J. Daemen et al., "AES Proposal: Rijndael", AES Proposal, Sep. 3, 1999, pp. 1-45.

*Primary Examiner*—Kim Vu
*Assistant Examiner*—Yogesh Paliwal
(74) *Attorney, Agent, or Firm*—Wenderoth, Lind & Ponack, L.L.P.

(57) ABSTRACT

A content playback apparatus prevents related content recorded on separate media that make up a virtual package from being played separately, thereby restricting playback of the content to only when the virtual package is assembled as intended by the creator, and protecting copyright of the content. A key obtaining unit obtains a second key, with use of key management information recorded on a recording medium on which related content relating to the encrypted content is also recorded. An information obtaining unit obtains the encrypted content and key generation information that relates to generation of the first key, from a source other than the recording medium. A key generation unit generates the first key with use of the second key and the obtained key generation information. A decryption unit decrypts the encrypted content with use of the first key.

20 Claims, 17 Drawing Sheets

U.S. PATENT DOCUMENTS

| | | | |
|---|---|---|---|
| 2002/0087818 A1* | 7/2002 | Ripley et al. | 711/164 |
| 2003/0202658 A1* | 10/2003 | Verbauwhede | 380/43 |
| 2004/0109569 A1* | 6/2004 | Ellison et al. | 380/277 |
| 2004/0136536 A1* | 7/2004 | Michtchenko | 380/277 |

FOREIGN PATENT DOCUMENTS

| | | |
|---|---|---|
| EP | 1 185 023 | 3/2002 |
| EP | 1 215 844 | 6/2002 |
| EP | 1 271 839 | 1/2003 |
| JP | 2000-285592 | 10/2000 |
| JP | 2002-015511 | 1/2002 |
| JP | 2002-281013 | 9/2002 |
| WO | 96/11446 | 4/1996 |
| WO | WO 9611446 A2 * | 4/1996 |
| WO | 00/51119 | 8/2000 |
| WO | 01/56221 | 8/2001 |
| WO | 02/095747 | 11/2002 |
| WO | 03/032300 | 4/2003 |

* cited by examiner

FIG.5

| CONTENT NUMBER(1) | UNIT VALUE 1(Vu_1) | SUB-CONTENT 1 |
| --- | --- | --- |
| CONTENT NUMBER(2) | UNIT VALUE 2(Vu_2) | SUB-CONTENT 2 |
| CONTENT NUMBER(3) | UNIT VALUE 3(Vu_3) | SUB-CONTENT 3 |
| CONTENT NUMBER(4) | UNIT VALUE 4(Vu_4) | SUB-CONTENT 4 |
| ... | ... | ... |
| CONTENT NUMBER(n-1) | UNIT VALUE n-1(Vu_n-1) | SUB-CONTENT n-1 |
| CONTENT NUMBER(n) | UNIT VALUE n(Vu_n) | SUB-CONTENT n |

FIG.6

| 41 | 42 |
|---|---|
| Vu_1 | E2(Kdev_1, SUB-CONTENT 1) |
| Vu_2 | E2(Kdev_2, SUB-CONTENT 2) |
| Vu_3 | E2(Kdev_3, SUB-CONTENT 3) |
| ... | ... |
| Vu_m-1 | E2(Kdev_m-1, SUB-CONTENT m-1) |
| Vu_m | E2(Kdev_m, SUB-CONTENT m) |

| STORED CONTENT | CORRESPONDING KEY |
|---|---|
| CONTENT 151 | NONE |
| CONTENT 152 | FIRST CONTENT KEY |
| CONTENT 153 | SECOND CONTENT KEY |
| CONTENT 154 | THIRD CONTENT KEY |

FIG.12A

| FIRST AUTHENTICATION RESULT | SECOND AUTHENTICATION RESULT | PLAYBACK PATH CORRESPONDING TO AUTHENTICATION RESULT COMBINATION |
|---|---|---|
| ILLEGAL | ILLEGAL | PLAYBACK PATH 261(CHAPTER 163→CHAPTER 161→CHAPTER 162) |
| ILLEGAL | LEGAL | PLAYBACK PATH 261(CHAPTER 163→CHAPTER 161) |
| LEGAL | ILLEGAL | PLAYBACK PATH 261(CHAPTER 163→CHAPTER 162) |
| LEGAL | LEGAL | PLAYBACK PATH 261(CHAPTER 163) |

FIG.12B

| FIRST AUTHENTICATION RESULT | SECOND AUTHENTICATION RESULT | SELECTED CONTENT |
|---|---|---|
| ILLEGAL | ILLEGAL | NONE |
| ILLEGAL | LEGAL | CONTENT 152 |
| LEGAL | ILLEGAL | CONTENT 153 |
| LEGAL | LEGAL | CONTENT 154 |

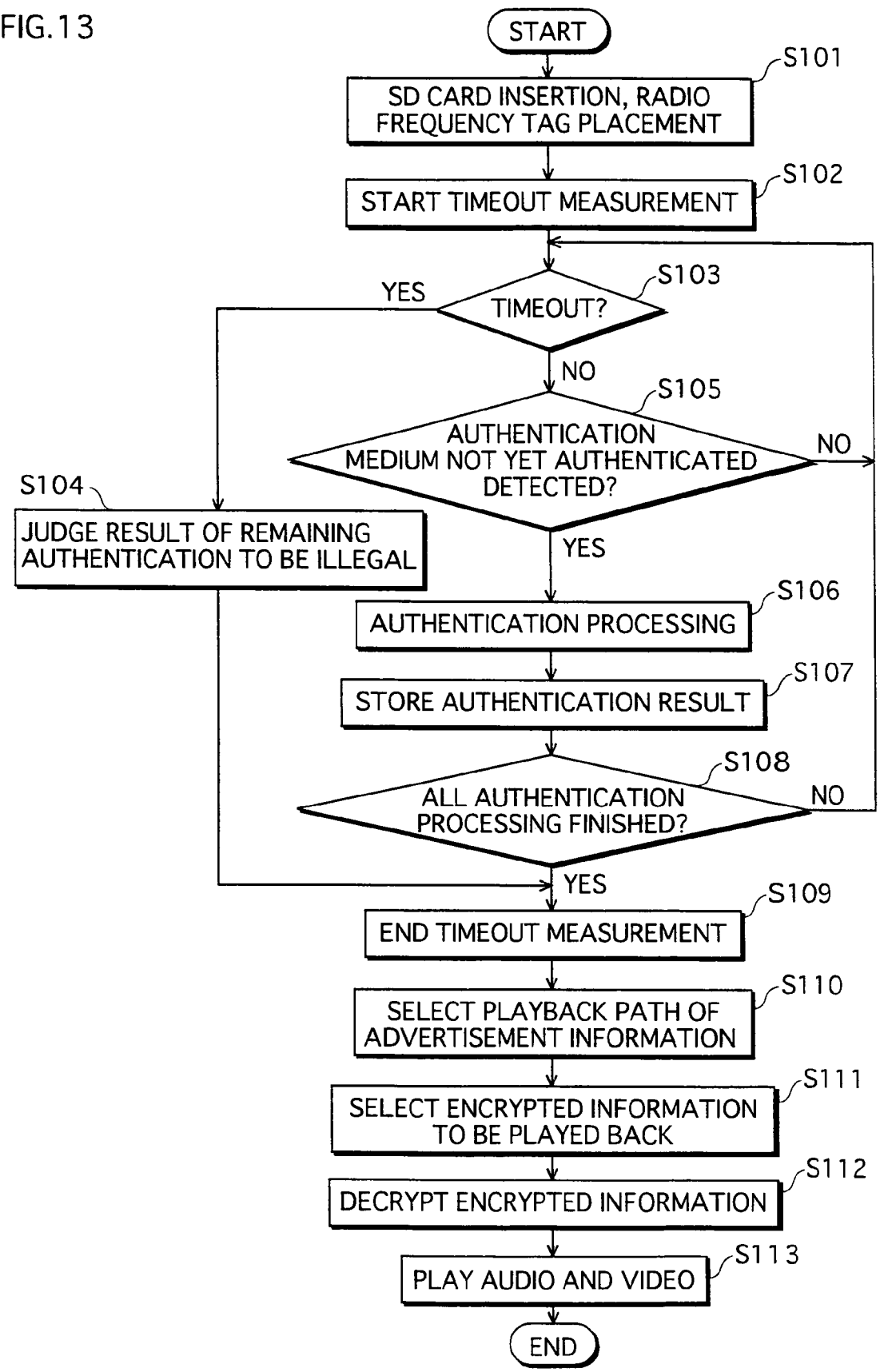

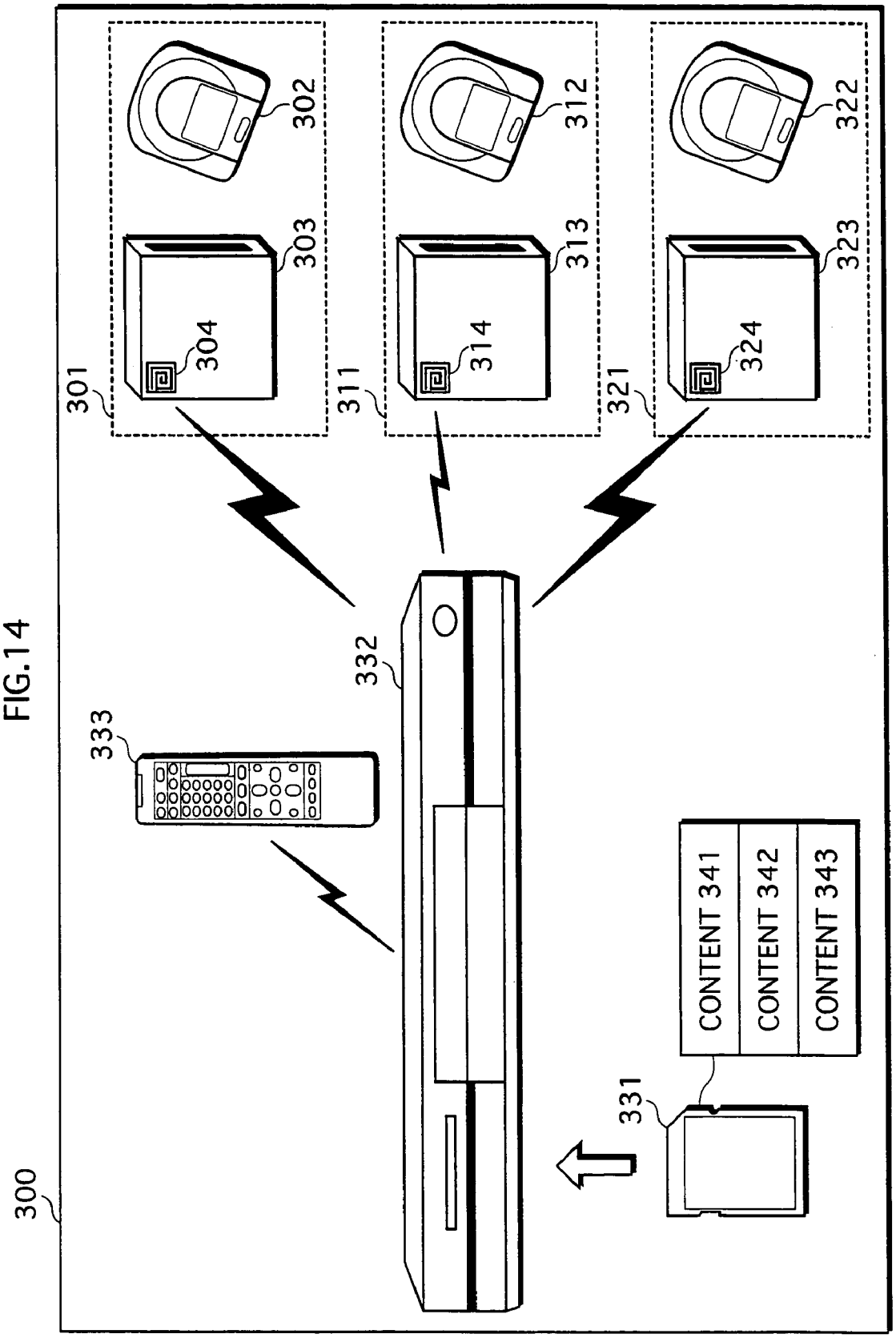

FIG.16

| IDENTIFIER MATCH COUNT | SELECTED CONTENT |
|---|---|
| 0 | NONE |
| 1 | CONTENT 341 |
| 2 | CONTENT 342 |
| 3 | CONTENT 343 |

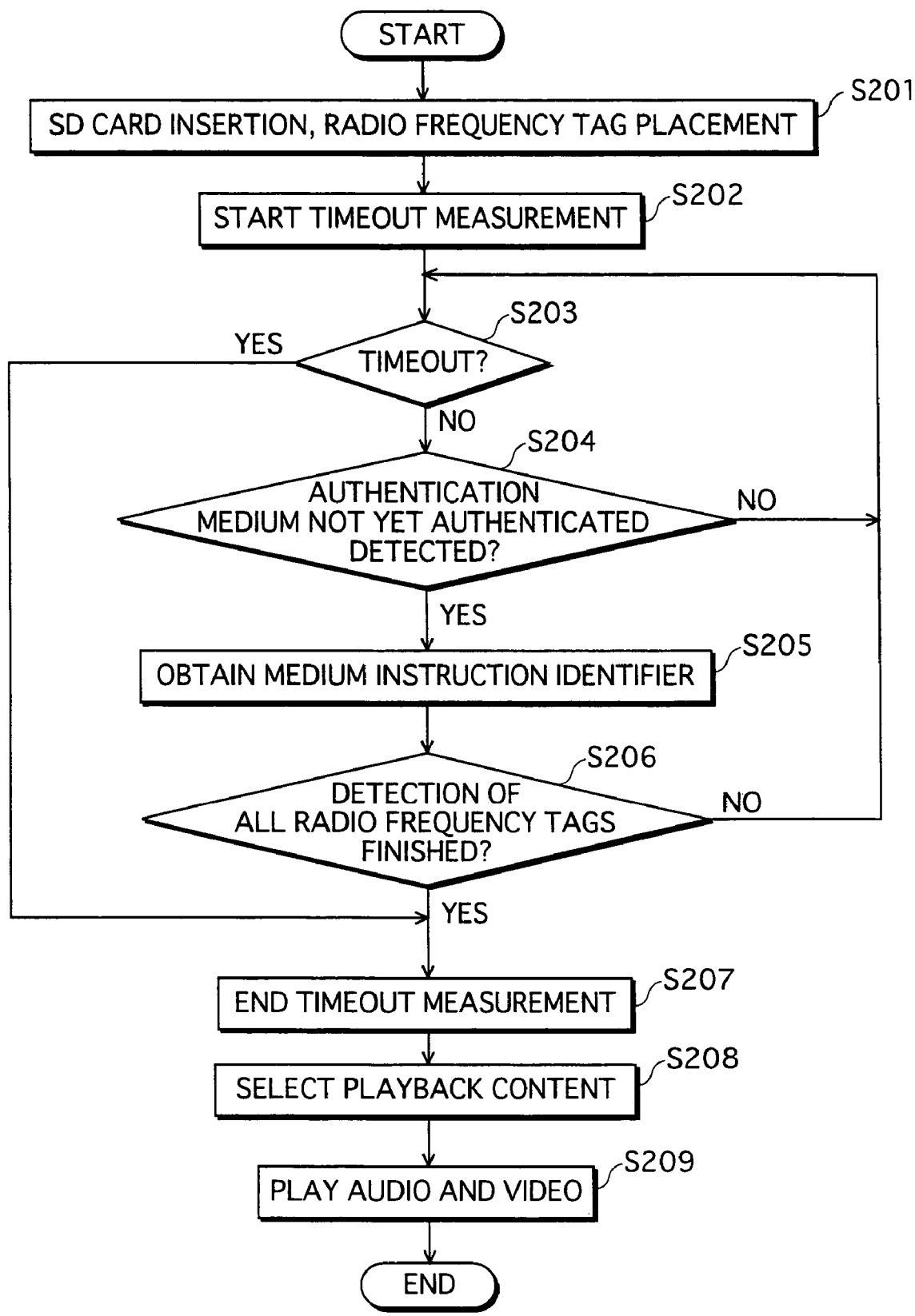

CONTENT PLAYBACK APPARATUS, CONTENT PLAYBACK METHOD, AND PROGRAM

This application is based on application No. 2003-173908 filed in Japan, the content of which is hereby incorporated by reference.

BACKGROUND OF THE INVENTION (1) Field of the Invention

The present invention relates to a playback apparatus for playing a plurality of related contents, and in particular, relates to a technique for protecting copyright of the content.

(2) Description of the Related Art

Digital contents have begun to be distributed in increasingly diverse forms in recent years, one of which is distribution using virtual packages.

A virtual package consists of a plurality of media on which mutually related digital contents are respectively recorded. The digital contents recorded on the plurality of media are treated by a playback apparatus as being recorded in one package.

As one example, a content creator pre-distributes large-capacity content (main content) that is a movie whose script is in English to the owner of a content playback apparatus, using a BD-ROM. After the English script has been translated into Japanese, the content creator distributes small-capacity content (sub-content) that is Japanese subtitles of the movie, using an SD card. When the sub-content has been distributed, the owner of the playback apparatus is able to watch the movie containing the main content and the Japanese subtitles that are the sub-content as if they were one content recorded in one package.

Since digital content is easily copied without deterioration of the information, protection of copyrights of digital content is crucial, regardless of whether or not it is distributed as a virtual package. For this reason, in addition to recording digital content in an encrypted state on a recording medium, information that prevents the content from being decrypted with a playback apparatus key that has been exposed is written to the recording medium. This technique, which is disclosed in JP 2002-281013A, improves copyright protection by preventing the content from being decrypted with the exposed key from recording media distributed after the key has been exposed.

However, this copyright protection is structured such that decryption of encrypted content can be complete only in information in a package in which digital content is recorded. Consequently, such copyright protection is problematic in that part of the content of a virtual package can be played without having all the elements that make up the virtual package.

For example, sub-content on an SD card can be played with only the SD card, in other words, without the BD-ROM that is also an element of the virtual package. This contravenes the intention of the copyright owner who created the package.

In view of the stated problem, the object of the present invention is to provide a content playback apparatus that plays content recorded in a virtual package in a manner that assembles the components of the virtual package as intended by the creator, and protects the copyright thereof.

SUMMARY OF THE INVENTION

In order to achieve the stated object, the content playback apparatus of the present invention is a content playback apparatus for obtaining encrypted content that has been generated by encrypting content with use of a first key, decrypting the obtained encrypted content, and playing the decrypted content. The content being encrypted based on the first key, the first key being generated by applying a predetermined operation to key generation information based on a second key, the second key being recorded on a recording medium so as to be extractable from the recording medium according to a predetermined procedure. The content playback apparatus including: a key obtaining unit operable to extract the second key from the recording medium according to the predetermined procedure; an information obtaining unit operable to obtain the encrypted content and the key generation information from an information source other than the recording medium; a key generation unit operable to apply the predetermined operation to the obtained key generation information, based on the second key, thereby generating a third (or first) key; and a decryption unit operable to decrypt the encrypted content based on the generated third (or first) key.

According to the stated structure, by restricting decryption of encrypted content to only be possible when the second key has been obtained using the information recorded on the recording medium, the content can be restricted to being played only when the virtual package is assembled as intended by the creator, and copyright can be protected.

Furthermore, the recording medium may have recorded thereon key management information that is generated by encrypting the second key based on a fourth key, and the key obtaining unit may include: a key storage sub-unit operable to store the fourth key which has been pre-assigned to the content playback apparatus; an information reading sub-unit operable to read the key management information from the recording medium; and a key obtaining sub-unit operable to obtain the second key by decrypting the key management information with use of the fourth key.

Playback of the content can be restricted to only a content playback apparatus that has the fourth key.

Furthermore, the recording medium may have recorded thereon key management information that is a list of encrypted second keys that have been generated by encrypting the second key respectively with use of a plurality of keys equivalent to the fourth key. The key obtaining unit may include: a key storage sub-unit operable to store the fourth key that has been pre-assigned to the content playback apparatus; an information obtaining sub-unit operable to obtain the key management information from the recording medium; and a key obtaining sub-unit operable to obtain the second key by decrypting, based on the fourth key, from among the encrypted second keys of the key management information, the encrypted second key that has been encrypted based on the fourth key.

According to the stated structure, the content cannot be played when the second key encrypted with the fourth key is not included in the list. Therefore, a content playback apparatus whose pre-stored key has been exposed is prevented from playing the content, and copyright of the content is protected.

Furthermore, the recording medium may have recorded thereon key management information that is a list of encrypted second keys that have been generated by encrypting the second key respectively with use of valid keys. The key obtaining unit may include: a key storage sub-unit operable to store a plurality of keys; an information obtaining sub-unit operable to obtain the key management information from the recording medium; and a key obtaining sub-unit operable to, when one of the plurality of keys stored in the key-storage sub-unit matches one of the valid keys, decrypt, from among the encrypted second keys of the key management information, an encrypted second key that has been encrypted based on the matching key, thereby obtaining the second key.

According to the structure, the content cannot be played if none of the encrypted second keys encrypted with the plurality of keys stored by the content playback apparatus is included in the list. Therefore, permission for the playback apparatus to play the content can be controlled by modifying the contents of the list, and copyright of the content is protected.

Furthermore, the recording medium having recorded thereon key management information including a list of encrypted fifth keys that have been generated by encrypting a fifth key respectively with a plurality of keys, and an encrypted second key that has been generated by encrypting the second key with the fifth key. The key obtaining unit may include: a key storage sub-unit operable to store a fourth key that has been pre-assigned to the content playback apparatus; an information obtaining sub-unit operable to obtain the key management information from the recording medium; a first key obtaining sub-unit operable to decrypt the encrypted fifth keys of the key management information respectively with use of the fourth key; and a second key obtaining sub-unit operable to, when the decryption by the first key obtaining sub-unit succeeds, decrypt the encrypted second key with the fifth key resulting from the decryption by the first key obtaining sub-unit, thereby obtaining the second key.

According to the stated structure, by restricting decryption the encrypted content to cases in which the fifth key and the second key have been obtained using the fourth key, the content can be restricted to being played only when the virtual package is assembled as intended by the creator, and copyright can be protected.

Furthermore, the key generation information may be an encrypted first key that has been generated by encrypting the first key with use of the second key, and the key generation unit may generate the third key by decrypting the obtained key generation information with the second key.

According to the stated structure, by restricting the decryption of content to when the third key having the same value as the first key has been obtained by decrypting the key generation information with the second key, the content can be restricted to being played only when the virtual package is assembled as intended by the creator, and copyright can be protected.

Furthermore, the key generation information may be arbitrary data of a predetermined length, and may be in correspondence with the content, and the first key may have been obtained as a result of subjecting the key generation information to one-way function processing according to a predetermined encryption method, based on the second key, and the key generation unit may subject the key generation information to one-way function processing based on a predetermined encryption method, based on the second key, and treat resultant data as the third key.

According to the stated structure, by restricting decryption of encrypted content, which has been encrypted based on a predetermined encryption method and using one-way function processing, to when the third key having the same value as the first key has been generated using the key generation information, the content can be restricted to being played only when the virtual package is assembled as intended by the creator, and copyright can be protected.

Furthermore, the first key may be an exclusive OR of the key generation information and encrypted key generation information generated by encrypting the key generation information based on the predetermined encryption method, with use of the second key, and the key generation unit may include: an encryption sub-unit operable to encrypt the key generation information based on the predetermined encryption method, with use of the second key; and a calculation sub-unit operable to calculate an exclusive OR of the key generation information and the encrypted key generation information, and treat the resultant data as the third key.

According to the stated structure, by restricting decryption of encrypted content, which has been encrypted based on a predetermined encryption method and using one-way function processing, to when the third key having the same value as the first key has been obtained using the key generation information, the content can be restricted to being played only when the virtual package is assembled as intended by the creator, and copyright can be protected.

Furthermore, the predetermined encryption method may be an AES encryption method, and the encryption unit may encrypt the key generation information according to the AES encryption method, based on the second key.

According to the stated structure, by restricting decryption of encrypted content, which has been encrypted based on a predetermined encryption method and using one-way function processing, to when the third key having the same value as the first key has been obtained using the key generation information, the content can be restricted to being played only when the virtual package is assembled as intended by the creator, and copyright can be protected.

Furthermore, the information obtaining unit may obtain the encrypted content and the key generation information via a network.

According to the stated structure, by restricting decryption of the encrypted content to when the second key is obtained using information recorded on the recording medium, playback of the content can be restricted a manner that assembles the components of the virtual package consisting of the recording medium and a content provider connected to via a network, as intended by the creator, and copyright can be protected.

Furthermore, the information obtaining unit may obtain the encrypted content and the key generation information from a dependant recording medium that is separate from the recording medium.

According to the stated structure, by restricting decryption of the encrypted content to when the third key having the same value as the first key is obtained using the key generation information, the content can be restricted to being played only when the virtual package is assembled as intended by the creator, and copyright can be protected.

Furthermore, the recording medium may have recorded thereon key management information that includes a list of encrypted fifth keys that have been generated by encrypting a fifth key respectively with each of a plurality of keys, and encrypted key generation information that has been generated by encrypting the key information with the fifth key. The information obtaining unit may include: a key storage sub-unit operable to store a fourth key that has been pre-assigned to the content playback apparatus; an information reading sub-unit operable to read the encrypted content and the key management information from the dependant recording medium; a first key obtaining sub-unit operable to decrypt the encrypted fifth keys of the key management information, based on the fourth key; and a second key obtaining sub-unit operable to, when the decryption by the first key obtaining sub-unit succeeds, decrypt the encrypted key generation information with use of the fifth key generated as a result of the decryption by the first key obtaining sub-unit.

According to the stated structure, by restricting decryption of the encrypted content to when the fifth key and the second key are obtained using the fourth key, the content can be restricted to being played only when the virtual package is assembled as intended by the creator, and copyright can be protected.

Furthermore, the information obtaining unit may obtain the encrypted content and the key generation information from a memory card separate from the recording medium.

According to the stated structure, by restricting decryption of the encrypted content to when the third key having the same value as the first key is obtained using the key generation information, playback of the content can be restricted a manner that assembles the components of the virtual package consisting of the recording medium and a memory card that is separate to the recording medium, as intended by the creator, and copyright can be protected.

Furthermore, the information obtaining unit may obtain the encrypted content and the key generation information from a disc separate from the recording medium.

According to the stated structure, by restricting decryption of the encrypted content to when the third key having the same value as the first key is obtained using the key generation information, playback of the content can be restricted a manner that assembles the components of the virtual package consisting of the recording medium and a disc that is separate to the recording medium, as intended by the creator, and copyright can be protected.

Furthermore, the encrypted content may have been generated by encrypting the content with use of a block encryption method, based on the first key, and the decryption unit may decrypt the encrypted content with use of the block encryption method, based on the first key.

According to the stated structure, by restricting decryption of the encrypted content, that has been encrypted based on a block encryption method, to when the third key having the same value as the first key is obtained, the content can be restricted to being played only when the virtual package is assembled as intended by the creator, and copyright can be protected.

Furthermore, the encrypted content may have been generated by encrypting the content with use of a C2 encryption method, based on the first key, and the decryption unit may decrypt the encrypted content with use of the C2 encryption method, based on the first key.

According to the stated structure, by restricting decryption of the encrypted content, that has been encrypted based on a C2 encryption method, to when the third key having the same value as the first key is obtained, the content can be restricted to being played only when the virtual package is assembled as intended by the creator, and copyright can be protected.

Furthermore, the encrypted content may have been generated by encrypting the content with use of a DES encryption method, based on the first key, and the decryption unit may decrypt the encrypted content with use of the DES encryption method, based on the first key.

According to the stated structure, by restricting decryption of the encrypted content, that has been encrypted based on a DES encryption method, to when the third key having the same value as the first key is obtained, the content can be restricted to being played only when the virtual package is assembled as intended by the creator, and copyright can be protected.

Furthermore, the encrypted content may have been generated by encrypting the content with use of an AES encryption method, based on the first key, and the decryption unit may decrypt the encrypted content with use of the AES encryption method, based on the first key.

According to the stated structure, by restricting decryption of the encrypted content, that has been encrypted based on an AES encryption method, to when the third key having the same value as the first key is obtained, the content can be restricted to being played only when the virtual package is assembled as intended by the creator, and copyright can be protected.

The content playback method of the present invention is a content playback method used in a content playback apparatus that includes a key obtaining unit, an information obtaining unit, a key generation unit and a decryption unit, and is for obtaining encrypted content that has been generated by encrypting content with a first key, and playing the decrypted content, the content being encrypted based on the first key, the first key being generated by applying a predetermined operation to key generation information based on a second key, the second key being recorded on a recording medium so as to be extractable from the recording medium according to a predetermined procedure. The content playback method including: a key obtaining step of extracting the second key from the recording medium according to the predetermined procedure; an information obtaining step of obtaining the encrypted content and the key generation information from an information source other than the recording medium; a key generation step of applying the predetermined operation to the obtained key generation information, based on the second key, thereby generating a third key; and a decryption step of decrypting the encrypted content based on the generated third key.

According to the stated structure, by restricting decryption of the encrypted content to when the second key is obtained using the information recorded on the recording medium, the content can be restricted to being played only when the virtual package is assembled as intended by the creator, and copyright can be protected.

The program of the present invention is a program applied to a content playback apparatus that includes a key obtaining unit, an information obtaining unit, a key generation unit and a decryption unit, and is for obtaining encrypted content that has been generated by encrypting content with a first key, and playing the decrypted content. The content being encrypted based on the first key, the first key being generated by applying a predetermined operation to key generation information based on a second key, the second key being recorded on a recording medium so as to be extractable from the recording medium according to a predetermined procedure. The program having a computer execute a method including: a key obtaining step of extracting the second key from the recording medium according to the predetermined procedure; an information obtaining step of obtaining the encrypted content and the key generation information from an information source other than the recording medium; a key generation step of applying the predetermined operation to the obtained key generation information, based on the second key, thereby generating a third key; and a decryption step of decrypting the encrypted content based on the generated third key.

According to the stated structure, by restricting decryption of the encrypted content to when the second key is obtained using the information recorded on the recording medium, the content can be restricted to being played only when the virtual package is assembled as intended by the creator, and copyright can be protected.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 5 shows an example of data stored in a sub-content storage unit;

FIG. 6 shows schematically data stored in a unit value holding unit and an encrypted sub-content storage unit of an SD card;

FIG. 12 shows information relating to playback control, held by a control unit;

FIG. 13 is a flowchart showing content playback processing in the content playback system;

FIG. 14 is a schematic drawing of the content playback system of a third embodiment of the present invention;

FIG. 16 shows a content playback control table; and

FIG. 17 is a flowchart showing content playback processing in the content playback system.

DETAILED DESCRIPTION OF THE INVENTION

First Embodiment

The following describes a content playback system of the first embodiment with use of the drawings.

First, an overview of the content playback system is given.

The object of the content playback system is, in the case of a virtual package that consists of (1) packaged media on which is recorded main content that is audio and video data or the like, and (2) package media on which is recorded sub-content that is data such as subtitles relating to the main content, to restrict decryption and playback of the sub-content such that it is able to be played only when a user also owns the main content packaged media, in other words, when the user has rights to the sub-content, and improve protection of copyright.

Specifically, here an example is used of the main content being a data stream, or the like, relating to audio and video of a movie, and the sub-content being a data stream of Japanese or Korean subtitles, or the like, that is not included in the main content. Furthermore, the copyright owner has created the sub-content with the intention that it be viewed only by a user who has purchased a packaged media on which the main content is recorded. The sub-content is not limited to being distributed as packaged media, but may be distributed over a communication wire, through broadcasting, or in another manner.

Figure 1:
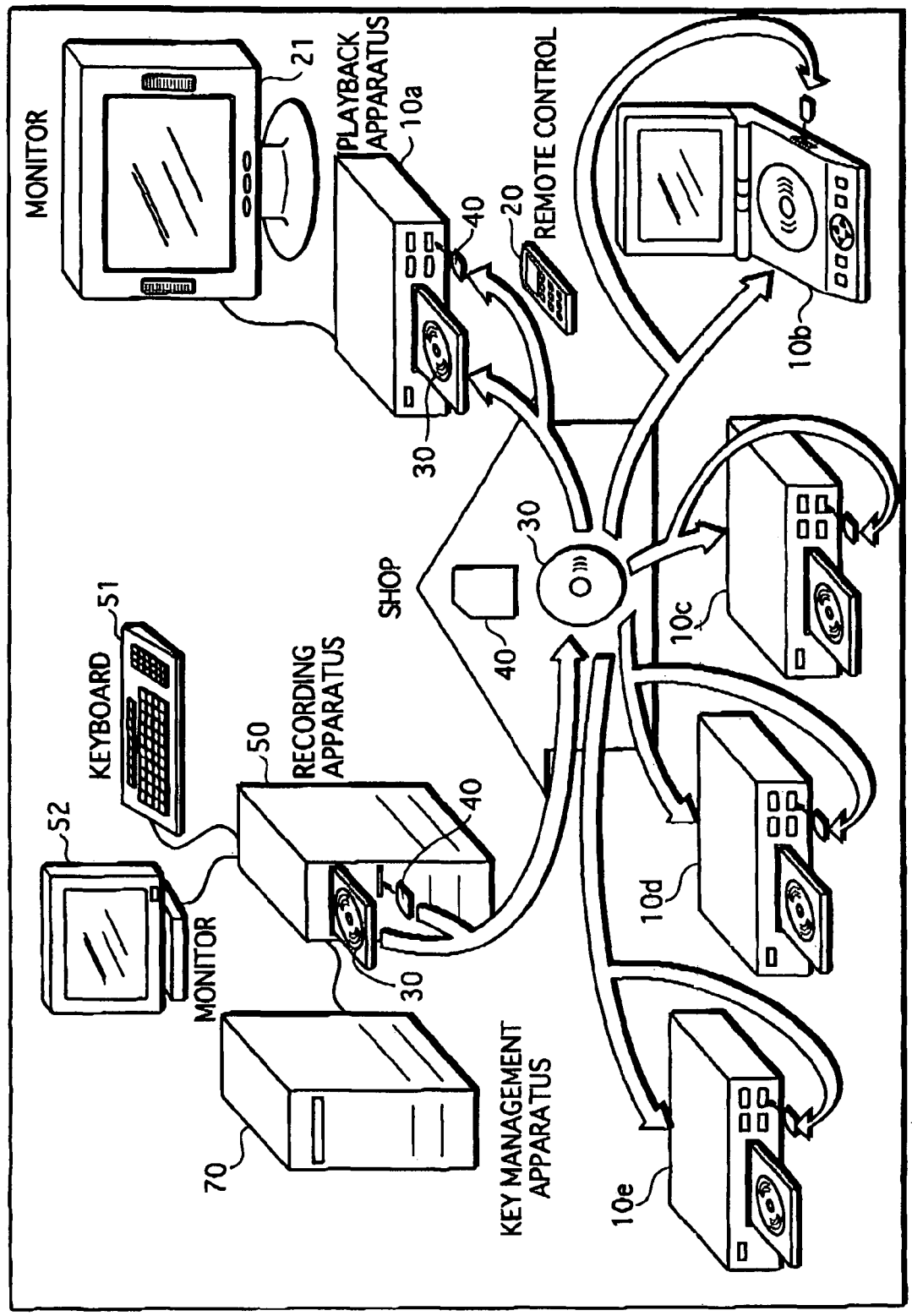
FIG. 1 shows an outline of a content playback system of the present invention.

FIG. 1 is an outline of the content playback system.

The content playback system is composed of a plurality of playback apparatuses 10a, 10b, 10c, 10d, 10e, etc., a BD-ROM 30, an SD card 40, a key management apparatus 70, and a recording apparatus 50. The playback apparatuses 10a, 10b, 10c, 10d, 10e, etc. are for playing the main content and the sub-content. The main content and related information are recorded on the BD-ROM 30. The sub-content and related information are recorded on the SD card 40, the sub-content being in an encrypted state. The key management apparatus 70 manages keys such as device keys that are assigned and distributed to the playback apparatuses, the device key of each playback apparatus being unique to that playback apparatus. In addition, the key management apparatus 70 writes various key information to a lead-in area or the like of the BD-ROM 30 during the BD-ROM manufacturing process. The recording apparatus 50 records information including content to the BD-ROM 30 and the SD card 40.

Note that in the following, content is played by a playback apparatus 10 which is one of the playback apparatuses 10a, 10b, 10c, 10d, 10e, etc.

The key management system 70 writes key management information and other information to the lead-in area or the like of the BD-ROM 30, and then transfers the BD-ROM 30 to the recording apparatus 50. The key management information is for revoking a predetermined device key or keys among the device keys distributed to the playback apparatuses.

The recording apparatus 50 is a content recording apparatus that includes a content editing function and is a personal computer or the like to which a keyboard 51 for operations, a monitor 52, and so on, are connected. The recording apparatus 50 writes main content to the BD-ROM 30 and sub-content relating to the main content to the SD card 40.

The BD-ROM 30 and the SD card 40 to which information has been written by the recording apparatus 50 are transferred to the user of the playback apparatus 10 through a retail shop. The user of the playback apparatus 10 inserts the obtained BD-ROM 30 and SD card 40 in respective insertion slots in the playback apparatus 10.

The playback apparatus 10 is a drive apparatus for reading the content of the BD-ROM 30, and is, specifically, a BD player or the like that includes a card reader/writer for reading and writing data from and to the SD card 40, and an optical unit for receiving instructions from a remote control 20. In accordance with an instruction given by the user using the remote control 20, the playback apparatus 10 plays content recorded on the BD-ROM 30 and the SD card 40, and outputs the played content to a monitor 21 which displays the content.

The following describes the key management apparatus 70.

Figure 2:
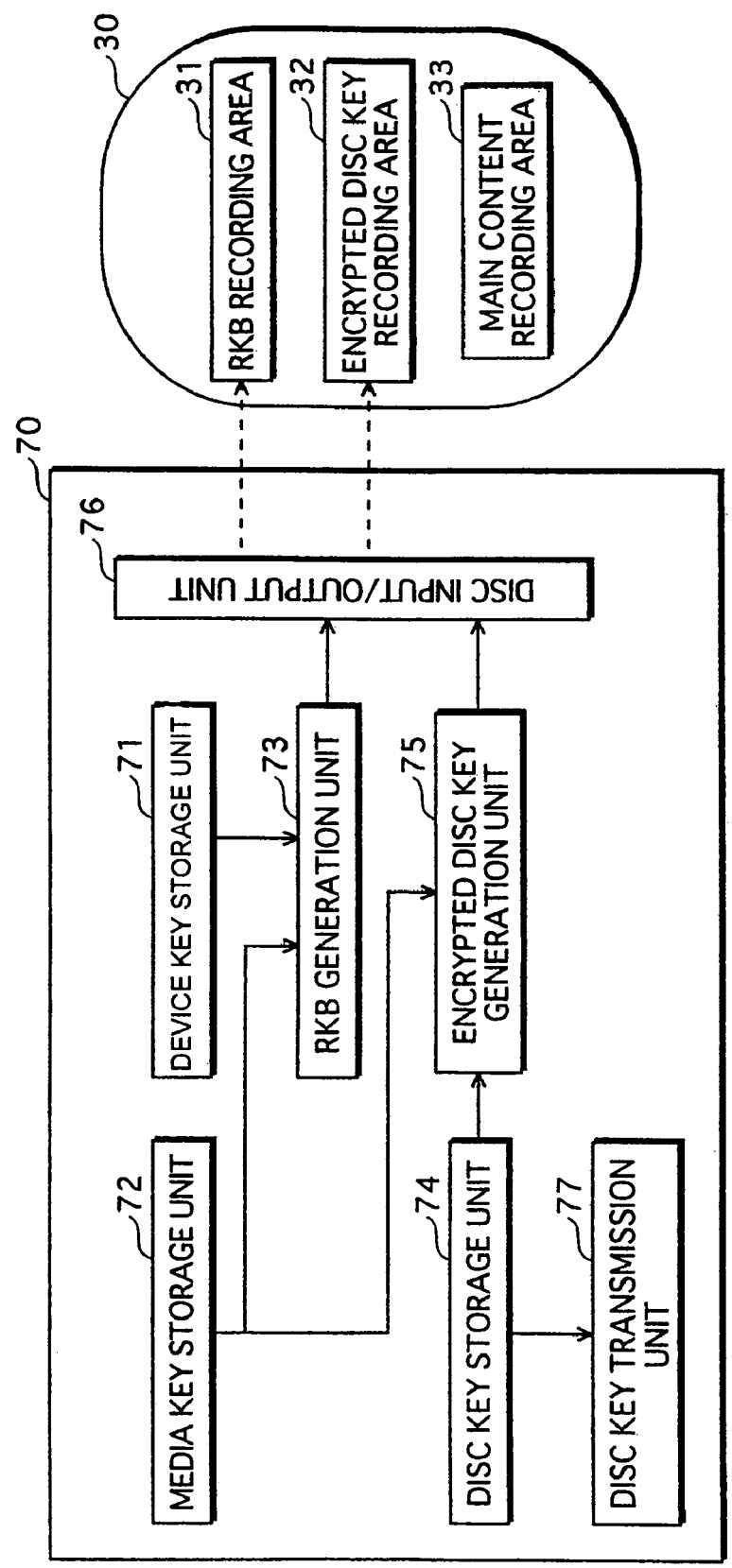
FIG. 2 is a block diagram of the structure of a key management apparatus.

FIG. 2 is a block diagram showing the structure of the key management apparatus 70.

The key management apparatus 70, as shown in FIG. 2, is composed of a device key storage unit 71, a media key storage unit 72, an RKB generation unit 73, a disc key storage unit 74, an encrypted disc key generation unit 75, and a disc input/output unit 76. Specifically, the key management apparatus 70 is a computer system that includes a CPU, a ROM, a RAM, a hard disc, and a disc drive or a disc machining apparatus that machines discs. A computer program is stored in the ROM, and the computer system achieves its functions by the CPU operating according to the computer program.

The device key storage unit 71 pre-stores valid device keys among the device keys distributed to the playback devices.

Each device key is data of a fixed bit-length (256 bytes, for example) that is pre-assigned uniquely to one of the playback apparatuses.

The media key storage unit 72 pre-stores media keys, each of which is assigned to each of a predetermined number of recording media (per dispatch lot, for example).

The media keys are notified by the recording medium manufacturer in advance. Here, the media key of the BD-ROM 30 is called Km.

The RKB (renewal key block) generation unit 73 is a list of encrypted media keys obtained as a result of encrypting Km with each of the device keys stored in the device key storage unit 71.

Figure 3:
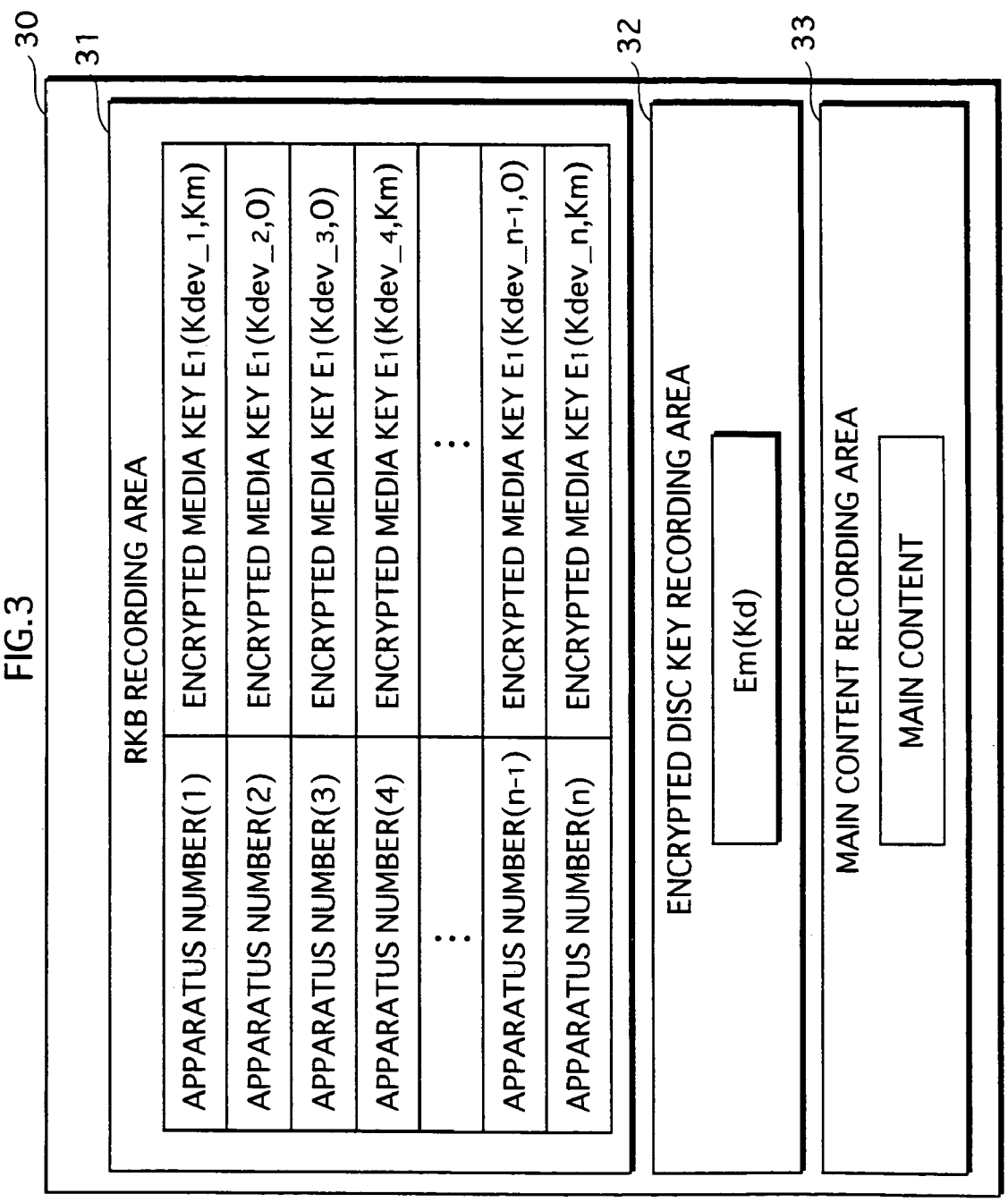
FIG. 3 shows schematically information written on a BD-ROM.

FIG. 3 shows an overview of information written in the BD-ROM 30.

As shown in FIG. 3, apparatus numbers assigned uniquely to the playback apparatuses and an encrypted media key are stored in correspondence as an RKB in an RKB recording area 31.

Kdev_1 represents a device key assigned to a playback apparatus whose device number is "1". E1(Kdev_1, Km) represents Km encrypted with Kdev_1 according to an encryption method E1.

Furthermore, E1(Kdev_2, 0) is recorded in correspondence with a playback apparatus "2". The result of decrypting E1(Kdev_2, 0) with a device key Kdev_2 will be "0", not a media key. This indicates that the apparatus of apparatus number 2 is revoked.

A commonly known method such as AES (advanced encryption standard) is suitable for the encryption method E1.

The RKB generation unit 73 records an RKB (described later) in the RKB recording area of the BD-ROM 30 via the disc input/output unit 76.

The disc key storage unit 74 stores disc keys, each of which is a key unique to one BD-ROM. The number of disc keys stored is equal to the number of BD-ROMs.

The disc key corresponding to the BD-ROM 30 is called Kd here.

The encrypted disc key generation unit 75 obtains Km from the media key storage unit 72, obtains Kd from the disc key storage unit 74, and encrypts Kd with Km using the AES encryption method.

Details of the AES encryption method can be found on the NIST (National Institute of Standards and Technology) website, and are therefore omitted from the present description.

Hereinafter, Em(Kd) expresses Kd that has been encrypted using Km.

The encrypted disc key generation unit 75 records the generated Em(Kd) as shown in FIG. 3 to an encrypted disc key recording area 32 of the BD-ROM 30 via the disc input/output unit 76.

The disc key transmission unit 77 notifies the recording apparatus 50 of the disc key used in the encrypted disc key generation unit 75, via a network.

The following describes the recording apparatus 50.

Figure 4:
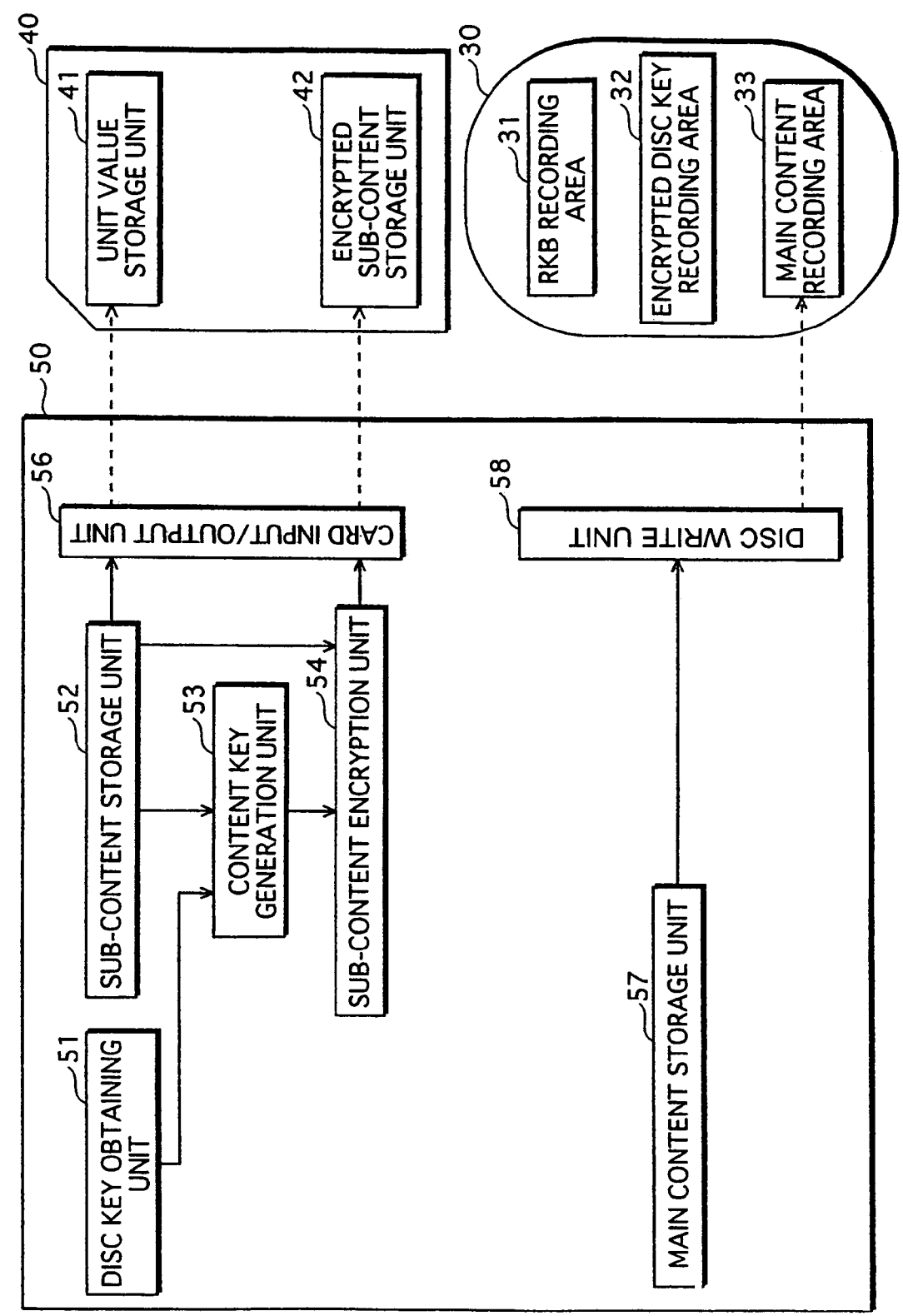
FIG. 4 is a block diagram showing the structure of a recording apparatus.

FIG. 4 is a block diagram showing the structure of the recording apparatus 50.

As shown in FIG. 4, the recording apparatus 50 is composed of a disc key obtaining unit 51, a sub-content storage unit 52, a content key generation unit 53, a sub-content encryption unit 54, a card input/output unit 56, a main content storage unit 57, and a disc write unit 58. Specifically, the recording apparatus 50 is a computer system that includes a CPU, a ROM, a RAM, a hard disc, a memory card reader/writer, and a disc drive or a disc machining apparatus that machines discs. A computer program is stored in the ROM, and the computer system achieves its functions by the CPU operating according to the computer program.

The disc key obtaining unit 51 obtains a disc key from the key management apparatus 70 via a network, and outputs the obtained disc key to the content key generation unit 53.

Here, the disc transferred from the key management apparatus 70 is the BD-ROM 30, and the disc key obtained by the disc key obtaining unit 51 is Kd.

The sub-content storage unit 52 pre-stores content numbers that identify sub-content, unit values, each of which is a value of a predetermined length (128 bits, for example) unique to a sub-content, and sub-contents, in correspondence.

FIG. 5 shows an example of data stored in the sub-content storage unit 52. For example, sub-content 1 is stored in correspondence with a content number "1", and a unit value having a value "Vu_1".

The sub-content storage unit 52 outputs a unit value corresponding to sub-content to be encrypted to the content key generation unit 53 and the card input/output unit 56, and outputs the sub-content corresponding to the output unit value to the sub-content encryption unit 54.

The content key generation unit 53 applies a one-way function, which utilizes an AES encryption, to the unit value obtained from the sub-content storage unit 52, outputs an exclusive OR of the result of applying the one-way function and the unit value to the sub-content encryption unit 54 as a content key Ku.

The content encryption unit 54 obtains the sub-content from the sub-content storage unit 52, and encrypts the obtained sub-content with the content key Ku.

A commonly known method such as AES is suitable for the encryption method.

The card input/output unit 56 writes the received unit value to the unit value storage unit 41 of the SD card 40, and records the encrypted sub-content to the encrypted sub-content storage unit 42 of the SD card 40.

FIG. 6 shows data stored in the unit value storage unit 41 and the encrypted sub-content storage unit 42 of the SD card 40, schematically. Each piece of data recorded in the unit value storage unit 41 is in correspondence with a piece of data recorded in the same position in the order in the encrypted sub-content storage unit 42.

For example, Vu_1 and E2(Ku_1, sub-content 1) are in correspondence, and Vu_m and E2(Ku_m, sub-content m) are in correspondence.

The main content storage unit 57 stores main content, and outputs the main content to the disc writing unit 58 which writes the main content to the main content recording area 33 of the BD-ROM 30, as shown in FIG. 3.

The following describes the playback apparatus 10.

In this example, the playback apparatus 10 is the playback apparatus having the apparatus number "1" in FIG. 3.

Figure 7:
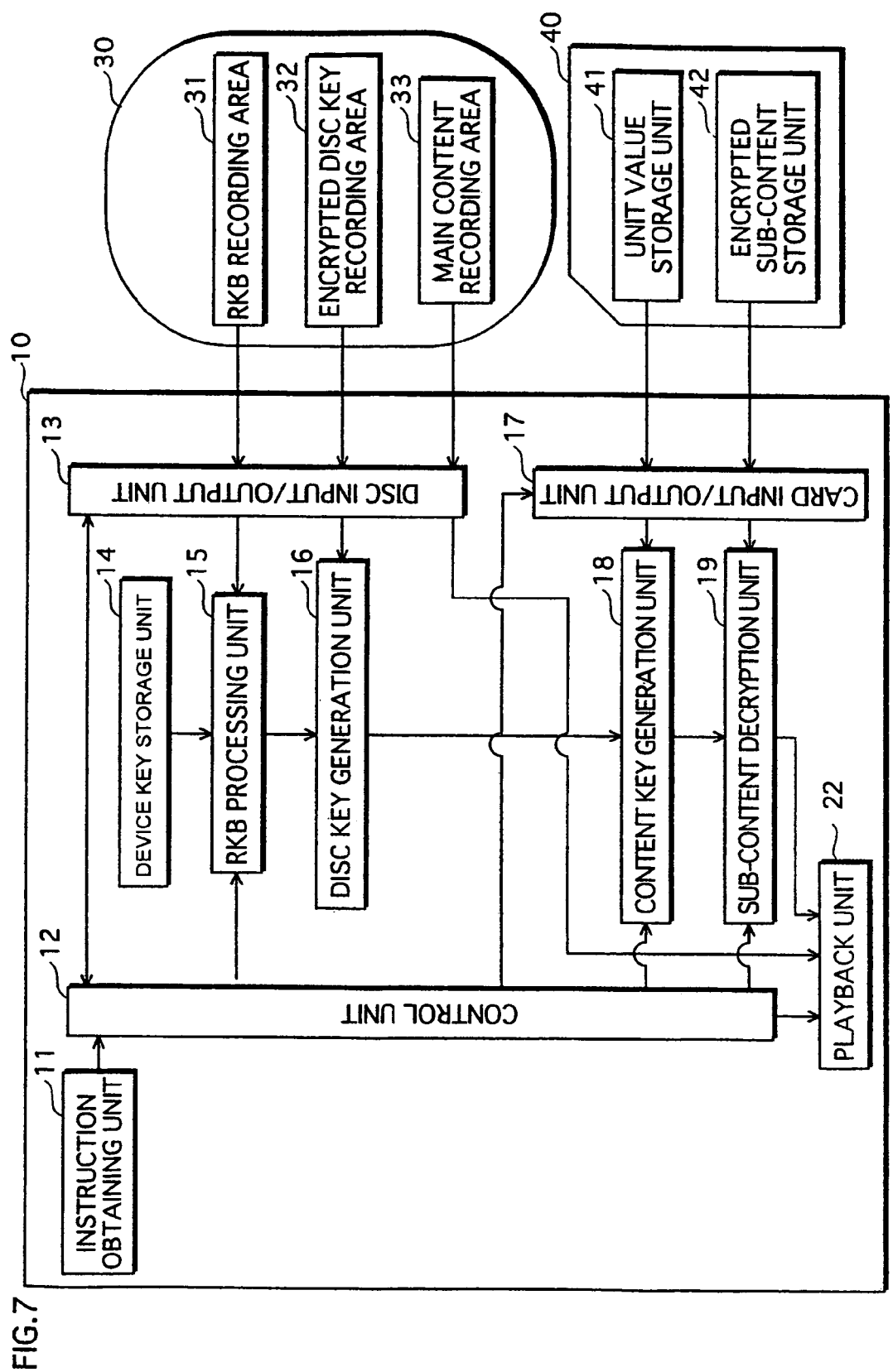
FIG. 7 is a block diagram showing the structure of a playback apparatus.

FIG. 7 is a block diagram showing the structure of the playback apparatus 10.

The playback apparatus 10, as shown in FIG. 7, is composed of an instruction obtaining unit 11, a control unit 12, a disc input/output unit 13, a device key storage unit 14, an RKB processing unit 15, a disc key generation unit 16, a card input/output unit 17, a content key generation unit 18, a sub-content decryption unit 19, and a playback unit 22. Specifically, the playback apparatus 10 is a BD player or the like that includes a CPU, a ROM, a RAM, an MPEG (moving picture experts group) decoder, an audio/video signal processing unit, an encryption processing unit, a disc drive, and a card reader/writer. A computer program is stored in the ROM, and the BD player achieves its functions by the CPU operating according to the computer program.

The instruction obtaining unit 11 obtains a user instruction corresponding to a user operation of the remote control 20, from the remote control 20, and transmits the obtained instruction to the control unit 12.

One type of user instruction is a content playback instruction that includes a content ID identifying content that the user desires to have played.

Specifically, the control unit 12 is the CPU and the computer program, and controls overall operations of the playback apparatus 10.

On receiving the content playback instruction, the control unit 12 instructs the disc input/output unit 13 to read an RKB from the BD-ROM 30, instructs the RKB processing unit 15 to process the RKB, instructs the card input/output unit 17 to read the unit value and the encrypted sub-content, and instructs the playback unit 22 to play the sub-content.

The disc input/output unit 13 includes a disc drive for reading information from the BD-ROM and the control unit of the disc drive. The disc input/output unit 13 reads the RKB from the BD-ROM in accordance with the instruction from the control unit 12 and outputs the read RKB to the RKB processing unit 15, reads Em(Kd) from the BD-ROM 30 and outputs the read Em(Kd) to the disc key generation unit 16, and reads the main content from the BD-ROM 30 and outputs the read main content to the playback unit 22.

The device key storage unit 14 is a non-volatile memory, and pre-stores a device key Kdev_1 that is a key unique to the playback apparatus.

The RKB processing unit 15, in accordance with the instruction from the control unit 12, after reading the device key Kdev_1 from the device key storage unit 14 and reading the RKB from the RKB storage area 31 of the BD-ROM 30 via the disc input/output unit 13, decrypts the encrypted media key E1(Kdev_1, Km), which corresponds to apparatus number "1" in the RKB in FIG. 3, with the device key Kdev_1 based on the AES encryption method, thereby obtaining Km. The RKB processing unit 15 then outputs the generated Km to the disc key generation unit 16.

Here, if, for example, the playback apparatus 10 is the apparatus having the revoked apparatus number "2", a value "0" will be obtained in the decryption processing in the RKB processing unit 15, and generation of the media key Km will fail. Consequently, decryption of the sub-content will fail.

The disc key generation unit 16 is an encryption processing unit that decrypts information in accordance with the AES encryption method. The disc key generation unit 16 obtains Km from the RKB processing unit 15, obtains Em(Kd) via the disc input/output unit 13, and decrypts Em(Kd) using Km based on the AES encryption method, thereby obtaining a disc key Kd.

The card input/output unit 17 is a card reader/writer that transfers information to and from the SD card 40. The card input/output unit 17 outputs the unit value read from the unit value storage unit 41 of the SD card 40 to the content key generation unit 18, and outputs encrypted sub-content read from the encrypted sub-content storage unit 42 to the sub-content decryption unit 19.

The content key generation unit 18 is an encryption processing unit that performs one-way function processing in accordance with the AES encryption. The content key generation unit 18 obtains the unit value from the unit value storage unit 41 of the SD card 40 via the card input/output unit 17, and obtains Kd from the disc key generation unit 16. The content key generation unit 18 then applies one-way function processing to the unit value with Kd in accordance with the AES encryption method, and outputs an exclusive OR of the result of the one-way function and the unit value to the sub-content decryption unit 19 as a content key Ku.

The sub-content decryption unit 19 obtains the encrypted sub-content from the encrypted sub-content storage unit 42 via the card input/output unit 17, and decrypts the encrypted sub-content using the content key Ku based on a predetermined encryption method (AES, for example).

The playback unit 22 is composed of an MPEG decoder and an audio/video signal processing unit. The playback unit 22 generates audio and video signals from the main content and the sub-content, and outputs the signals to the monitor 21.

The following describes operations of the playback apparatus 10 for decrypting and playing sub-content.

In the present example, it is assumed the playback apparatus 10 has the apparatus number "1", and has been instructed by the user to play "sub-content 1" that has a content number "1".

Figure 8:
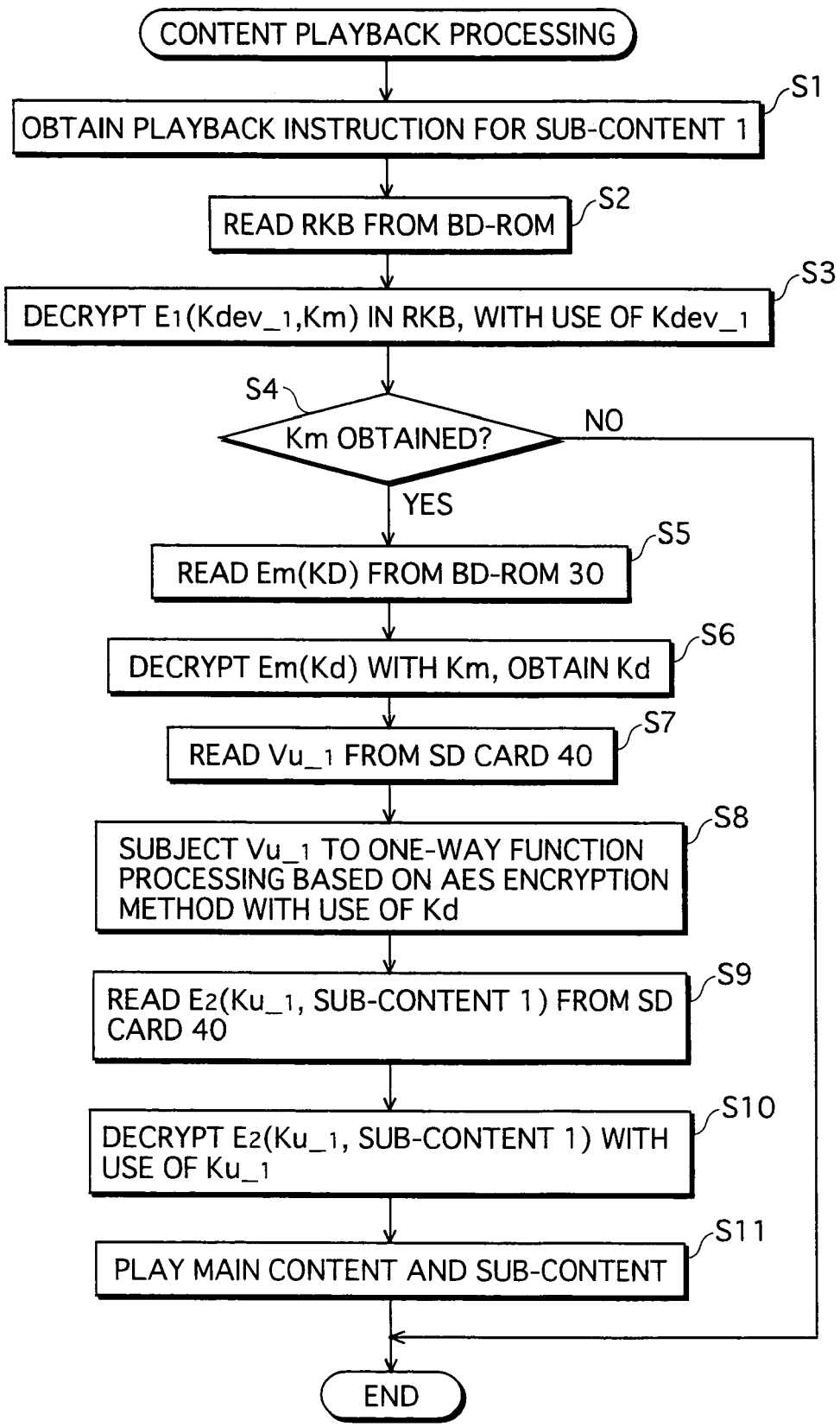
FIG. 8 is a flowchart showing operations by the playback apparatus when playing content.

FIG. 8 is a flowchart showing operations when the playback apparatus 10 plays content.

The user of the playback apparatus 10 inserts the BD-ROM 30 in the disc drive of the playback apparatus 10, and inserts the SD card 40 in the card reader/writer of the playback apparatus 10.

The user uses the remote control 20 to instruct the playback apparatus to play the sub-content 1 that has the content number "1" (step S1).

The instruction obtaining unit 11 obtains a user instruction instructing playback of the sub-content 1, from the remote control 20, and transmits the received user instruction to the control unit 12.

The control unit 12 obtains the user instruction, stores the value "1" as the content number of the content to be played, and instructs the RKB processing unit 15 to read the RKB.

The RKB processing unit 15 reads the RKB from the RKB recording area 31 of the BD-ROM 30 via the disc input/output unit 13 (step S2).

The RKB processing unit 15 obtains the device key Kdev_1 from the device key storage unit 14, extracts E1(Kdev_1,Km), which corresponds to the apparatus "1", from the RKB, and decrypts E1(Kdev_1,Km) with Kdev_1 (step S3).

When Km fails to be obtained according to the decryption at step S3 (step S4: NO), the processing ends.

When Km is successfully obtained according to the decryption at step S3 (step S4: YES), the disc key generation unit 16 reads Em(Kd) from the encrypted disc key storage area 32 of the BD-ROM 30 via the disc input/output unit 13 (step S5).

The disc key generation unit 16 decrypts Em(Kd) with Km, thereby obtaining Kd, and outputs Kd to the content key generation unit 18 (step S6).

The content key generation unit 18 reads Vu_1, which is the unit value corresponding to the content number "1" stored by the control unit 12, from the unit value storage unit 41 of the SD card 40, via the card input/output unit 17 (step S7).

The content key generation unit 18 applies one-way function processing with Kd to Vu_1 in accordance with the AES encryption method, and outputs an exclusive OR of the result of the one-way function processing and Vu_1 to the sub-content decryption unit 19 as a content key Ku_1 (step S8).

The sub-content decryption unit 19 obtains Ku_1 and reads "encrypted sub-content 1", which corresponds to the content number "1" stored by the control unit 12, from the encrypted sub-content storage unit 42 via the card input/output unit 17 (step S9).

The sub-content decryption unit 19 decrypts the encrypted sub-content 1 using the content key Ku_1, and outputs the decrypted sub-content 1 to the playback unit 22 (step S10).

The playback unit 22 reads the main content form the main content storage unit 33 via the disc input/output unit 13, and obtains the sub-content from the sub-content decryption unit 19. The playback unit 22 then generates audio and video signals from the main content and the sub-content, and outputs the audio and video signals to the monitor 21 (step S11).

As has been described, according to the content playback system of the present invention, playback of sub-content by the playback apparatus is restricted to cases in which the packaged media on which content is recorded is inserted in the disc drive of the playback apparatus and the disc key Kd is able to be obtained.

Furthermore, the unit value may be distributed together with the encrypted sub-content, thus eliminating the need to generate a unit value in advance when creating the main content.

Furthermore, the present invention makes encrypting of each sub-content using different content keys simpler, and even if a unit value is exposed, effects of the exposition can be kept local, so as to only effect the sub-content corresponding to the exposed unit value.

Modifications of the First Embodiment (1) Although AES is described as being used for encrypting and decrypting in the present embodiment, another encryption method such as DES (data encryption standard) or C2 may be used.

(2) The recording medium is not limited to having an encrypted disc key and an RKB stored thereon as in the present embodiment. For example, the disc key may be stored directly on the recording medium. However, in such a case, it is necessary to record the disc key using a special method in order to prevent the disc key being read by an illegal playback apparatus. As on example of the special method, information may be cut into the BCA (Burst Cutting Area) of the disc with a special laser.

(3) The recording medium that stores the sub-content is not limited to storing only the unit value and the encrypted content as described in the present embodiment. Instead, an encrypted disc key and an RKB may be stored thereon. In this case, the unit value corresponding to the sub-content is stored in an encrypted state, having been encrypted with a disc key obtained from the RKB and the encrypted disc key. The playback apparatus obtains the unit value from the recording medium on which the sub-content is stored, obtains a disc key from the RKB and the encrypted disc key stored on the sub-content recording medium, and generates a key for decrypting the content from the obtained unit value and disc key which is derived from the RKB and the encrypted disc key stored on the main content recording medium.

Second Embodiment

Figure 9:
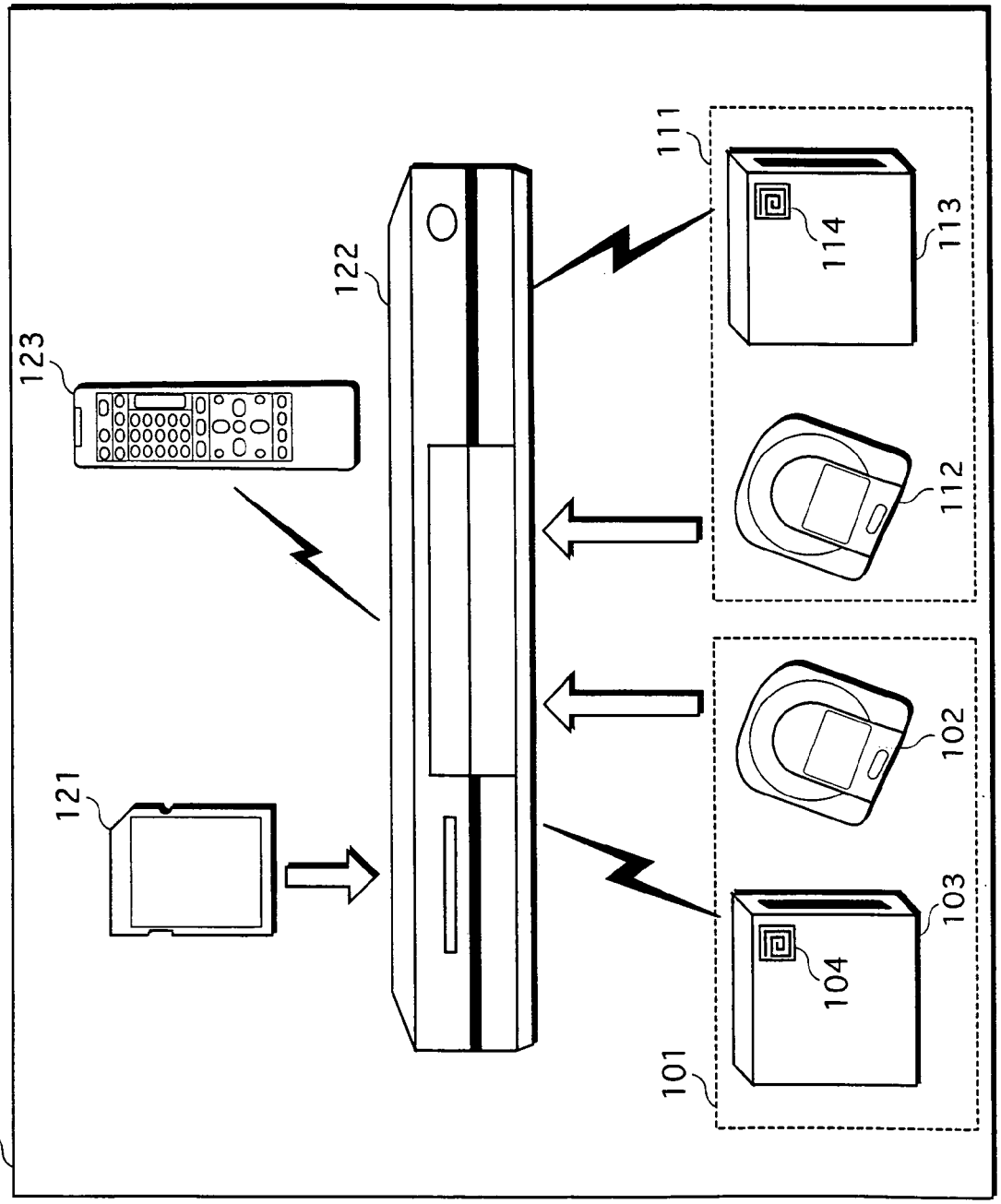
FIG. 9 is a schematic drawing of a content playback system of a second embodiment of the present invention.

The following describes the second embodiment of the present invention with use of the drawings.
<Overview>
FIG. 9 is a schematic drawing of a content playback system 100 of the second embodiment of the present invention.

A BD (Blu-ray Disc) player 122 is a content playback apparatus that plays content stored on a BD-ROM or an SD card. The BD player 122 includes a function of performing radio communication with a radio frequency tag.

A package 101 is composed of a BD-ROM 102, which is a medium on which content is stored, a box 103 in which the BD-ROM 102 is stored, and a radio frequency tag 104 that is an authentication device attached to the box 103.

The radio frequency tag 104 performs radio communication with the BD player 122.

The content recorded on the BD-ROM 102 is stream information that is a data stream of audio and video of a movie called "Galaxy Wars, Part 1."

A package 111 is composed of a BD-ROM 112, a box 113 that stores the BD-ROM 112, and a radio frequency tag 114 that is attached to the box 113.

The radio frequency tag 114 performs radio communication with the BD player 122.

The BD-ROM 112 stores stream information of a data stream of audio and video of an movie of the title "Galaxy Wars: Part 2", which is the sequel to "Galaxy Wars: Part 1" recorded on the BD-ROM 102.

Here, it is assumed that a user of the BD player 122 already possesses the package 101 and the package 111.

In order to have the BD player 122 play the content stored on either the BD-ROM 102 or the BD-ROM 112, the user inserts the one of the BD-ROMs that stores the content that the user wishes to play into a predetermined BD-ROM slot.

The BD player 122 reads the content that the user wishes to play from the inserted BD-ROM, and plays the read content.

Furthermore, the user transmits user instructions to the BD player 122 with use of a remote control 123 by pressing operation keys such as a fast forward key, a rewind key, and a stop key. On receiving a user instruction, the BD player 122 performs control relating to content playback, such as fast forwarding, rewinding, and stopping, in accordance with the user instruction.

The SD card 121 is a recording medium on which content is recorded, and is distributed to the user separately to the package 101 or the package 111.

The SD card 121 is electrically connected to the BD player 122 by being mounted in the predetermined SD card slot therein.

The SD memory card 121 stores stream information that is a data stream of audio and video of a program related to the movie stored on the BD-ROM, such as a behind-the-scenes video of the movie, or a commercial video or the like that is unrelated to the movie.

Here, a behind-the-scenes video is a video that, for example, shows how the movie was filmed, secrets of the filming, or the activities of the performers in the movie during waiting time in the filming. A commercial video is a video for advertising a product or the like that is not related to the main feature movie.

Figures 10A, 10B:
FIG. 10 shows information relating to content stored by an SD card.

FIGS. 10A and 10B show information relating to content stored on the SD card 121.

FIG. 10A shows content stored on the SD card 121.

The SD card 121 stores four contents: contents 151, 152, 153, and 154.

The content 151 is stream information of a commercial video that is unrelated to the movie.

The content 152 is encrypted information generated by encrypting data stream information of a behind-the-scenes video of the movie "Galaxy Wars: Part 1" with use of a first content key. The content 152 can be decrypted with the first content key.

The content 153 is encrypted information generated by encrypting data stream information of a behind-the-scenes video of the movie "Galaxy Wars: Part 2" with use of a second content key. The content 153 can be decrypted with the second content key.

The content 154 is encrypted information generated by encrypting, with use of a third content key, stream data of a highlights video that includes a behind-the-scenes video of a movie "Galaxy Wars: Part 3" that has not yet been released, in addition to the behind-the-scenes videos of the movies "Galaxy Wars: Part 1" and "Galaxy Wars: Part 2". The content 154 can be decrypted with the third content key.

The third content key is generated from the first content key and the second content key.

In this example, the first content key is stored in a storage area in the radio frequency tag 104, and the second content key is stored in a storage area in the radio frequency tag 114.

FIG. 10B shows the structure of the content 151 in a simplified manner.

The content 151 is composed of three sections: a chapter 161, a chapter 162, and a chapter 163.

The chapter 161 is commercial video for encouraging purchase of the package of "Galaxy Wars: Part 1", and is intended by the creator of the content 151 to be viewed by users who have not purchased the package 101.

The chapter 162 is commercial video for encouraging purchase of the package of "Galaxy Wars: Part 2", and is intended by the content creator to be viewed by users who have not purchased the package 111.

The chapter 163 is commercial video for advertising a product or the like that is unrelated to "Galaxy Wars: Part 1" and "Galaxy Wars: Part 2", and is intended by the content creator to be viewed by all users, regardless of whether the user has purchased the packages.

Each of the chapters 161, 162, and 163 are played by the BD player 122 following playback path information that indicates playback permission and a playback order.

The path playback information is described later.

<Structure>

Figure 11:
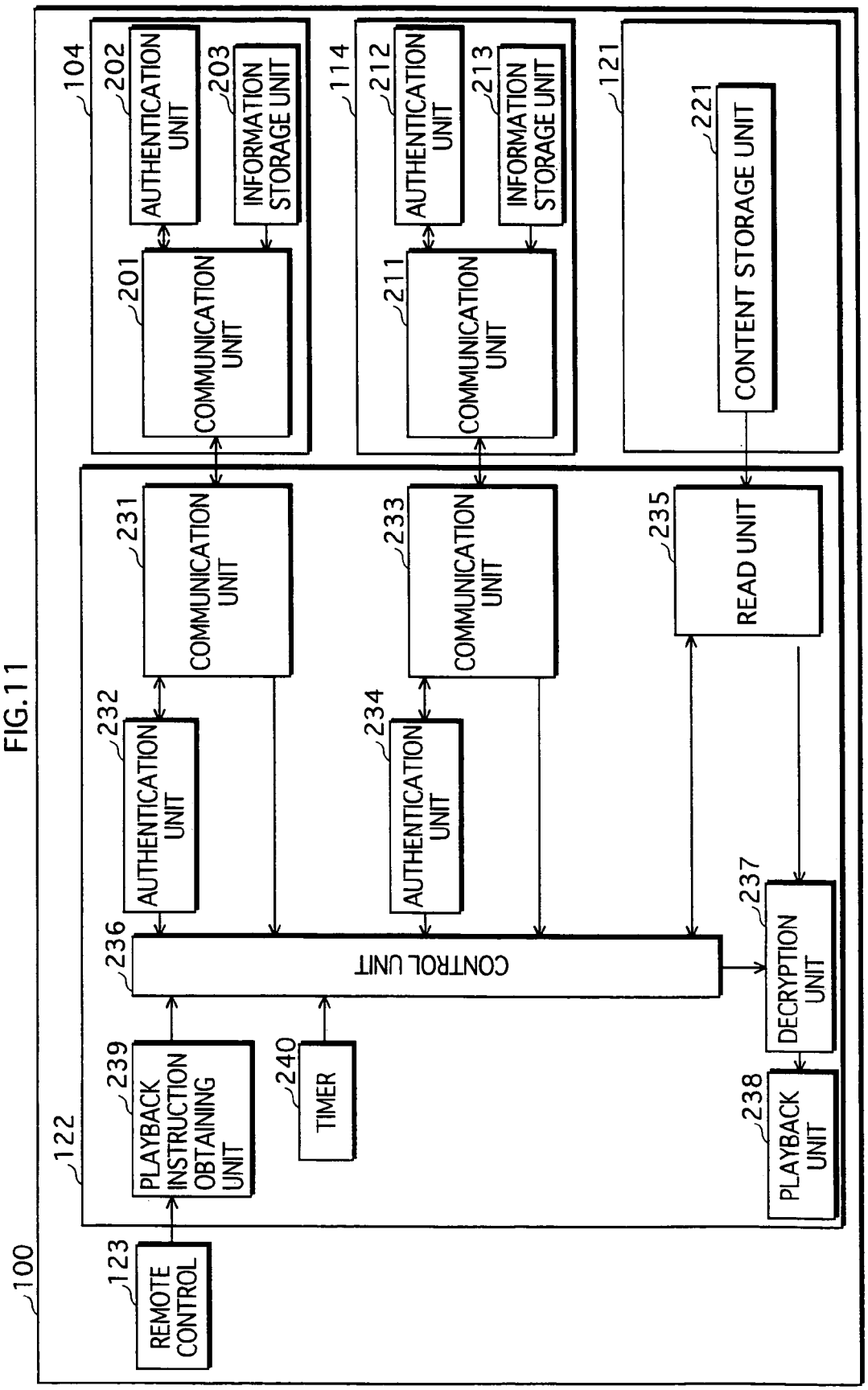
FIG. 11 is a block diagram showing the structure of the content playback system in terms of function.

FIG. 11 is a block diagram showing the structure of the content playback system 100 in terms of function.

<Radio Frequency Tags 104 and 114>

Specifically, each of the radio frequency tags 104 and 114 is a module composed of an IC that has the function of performing radio communication, an antenna, and a small-capacity storage area.

In terms of function, the radio frequency tag 104 is composed of a communication unit 201, an authentication unit 202, and an information storage unit 203, as shown in FIG. 11.

The communication unit 201 performs radio communication with the BD player 122.

The authentication unit 202 performs authentication processing with the BD player 122 via the communication unit 201.

In this example, challenge-response authentication is used in the authentication processing.

The following describes challenge-response authentication.

The BD player 122 and the authentication unit 202 store a parent password in advance.

The BD player 122 generates a random number, and transmits the random number to the authentication unit 202.

The authentication unit 202 calculates a child password that is a hash value of information that consists of the parent password and the random number, and transmits the child password to the BD player 122.

The BD player 122 calculates a hash value of information that consists of the parent password and the random number, and when the calculated hash value matches the child password transmitted by the authentication unit 202, judges that the result of authentication is legal.

The authentication unit 202 receives the authentication result from the BD player 122.

The information storage unit 203 stores the first content key.

When the result of authentication processing by the authentication unit 202 is legal, the information storage unit 203 transmits the first content key of the BD player 122 via the communication unit 201.

The radio frequency tag 114 has the same structure as the radio frequency tag 104, and is composed of a communication unit 211, an authentication unit 212, and an information storage unit 213.

The radio frequency tag 114 stores the second content key in the information storage unit 213.

<SD Card 121>

Specifically, the SD card 121 is a memory card that includes an IC and a large-capacity storage area.

As shown in FIG. 11, in terms of function, the SD card 121 has a content storage unit 221.

The content storage unit 221 stores the contents 151 to 154 as described earlier.

<BD Player 122>

The communication units 231 and 233 perform radio communication with the radio frequency tags 104 and 114.

The authentication unit 232 performs challenge-response authentication processing with the radio frequency tag 104.

The authentication unit 232 outputs a first authentication result, which is the result of the authentication processing, to the control unit 236, and also transmits the first authentication result to the radio frequency tag 104 via the communication unit 231.

The communication unit 231 receives the first content key stored by the information storage unit 203 via the communication unit 201, and outputs the first content key to the control unit 236.

The authentication unit 234 performs challenge-response authentication processing with the radio frequency tag 114 via the communication unit 233.

The authentication unit 234 outputs a second authentication result, which is the result of the authentication processing, to the control unit 236, and also transmits the second authentication result to the radio frequency tag 114 via the communication unit 233.

The communication unit 233 receives the second content key stored by the information storage unit 213 via the communication 211, and outputs the second content key to the control unit 236.

The control unit 236 obtains the first and second authentication results from the authentication units 232 and 234, and performs playback control of the content stored in the SD card 121, by instructing the decryption unit 237 and the playback unit 238 in accordance with the combination of the authentication results.

The control unit 236 stores, in advance, a playback path selection table relating to the playback path information.

FIGS. 12A and 12B show information relating to playback control, stored by the control unit 236.

FIG. 12A is the playback path selection table stored by the control unit 236.

The playback path selection table indicates correspondence between combinations of whether each of the first and second authentication results are legal or illegal, and the playback path information.

Here, the playback path information indicates a playback order in which the chapters are played.

For example, a playback path 261 indicates that the chapters are played in order of chapter 163, chapter 161, and chapter 162.

When both the obtained first and second authentication results indicate illegal, the control unit 236 selects the playback path 261 based on the playback path selection table.

FIG. 12B shows a playback permission judgment table stored in the control unit 236.

The playback permission judgment table indicates correspondence between combinations of whether each of the first and second authentication results are legal or illegal, and content among content 152 to 154 to be played.

For example, when both the obtained first and second authentication results are legal, the control unit 236, in accordance with the playback permission judgment table, controls so that the content 154 is played.

Furthermore, by storing a correspondence table, the control unit 236 understands that the first content key corresponds to the content 152, that the second content key corresponds to the content 153, and that the third content key can be generated from the first and second content keys and corresponds to the content 154.

The control unit 236 receives the first content key stored in the information storage unit 203 via the communication 231, and receives the second content key stored in the information storage unit 213 via the communication unit 233.

The decryption unit 237 obtains the first content key and the second content key from the control unit 236.

The decryption unit 237 generates the third content key from the first content key and the second content key.

Furthermore, when the content that the control unit 236 has judged will be played is encrypted, the decryption unit 237 decrypts the content with the corresponding one of the first to third content keys.

The playback unit 238 plays content instructed by the control unit 236.

The playback instruction obtaining unit 239 obtains the user instruction from the remote control 123, and outputs the user instruction to the control unit 236.

The timer 240 includes a clock and a counter. A timeout value that is a multiple of 1 second is set by the control unit 236 in the counter.

The timer 240 counts down from the time out value, subtracting "1" every one second.

<Operations>

The following describes operations in content playback processing in the content playback system 100, with reference to FIG. 13.

FIG. 13 is a flowchart showing content playback processing in the content playback system 100.

The user inserts the SD card 121 into the SD slot in the BD player 122 (step S101).

The BD player 122 and the SD card 121 are electrically connected.

The user places the radio frequency tags 104 and 114 such that they are in a range in which radio communication with the BD player 122 is possible.

The control unit 236 sets a value "5" in the timer 240, indicating a timeout value of five seconds (step S102).

The timer 240 counts down from the set value, subtracting "1" every second.

The control unit 236 judges whether the present value in the timer 240 is a value "0" that expresses timeout (step S103).

If the timer 240 indicates timeout, the timer 240 judges the result of the unfinished authentication to be illegal, and notifies the authentication result to the control unit 236 (step S104).

The communication units 231 and 233 attempt to communicate with a radio frequency tag with which authentication processing has not been performed (step S105).

If neither of the communication units 231 and 233 is able to communicate with the radio frequency tag with which authentication processing has not been performed, the process returns to step S103.

If one of the communication units 231 and 233 are able to communicate with the radio frequency tag with which authentication processing has not been performed, authentication processing is performed (step S106).

The authentication processing is challenge-response authentication as described earlier, and the authentication result is either "legal" or "illegal".

The authentication unit that performed authentication notifies the authentication result to the control unit 236 (step S107).

The control unit 236 stores the authentication result.

The control unit 236 judges whether all authentication processing has finished by checking whether or not all authentication results that should have been obtained have been obtained (step S108).

If the control unit 236 judges that all authentication processing has not finished, the processing returns to step S103 and continues.

When the control unit 236 judges that all authentication processing has finished, the processing proceeds to step S109.

The control unit 236 instructs the timer 240 to stop the count down, thereby ending timeout measurement processing (step S109).

The control unit 236 selects a playback path corresponding to the combination of obtained authentication results, from the playback path selection table (step S110).

The control unit 236 selects encrypted information corresponding to the combination of authentication results, from the playback permission judgment table (step S111).

The decryption unit 237 obtains the first content key and the second content key from the control unit 236, and generates the third content key (step S112).

The decryption unit 237 decrypts the selected encrypted content using the corresponding one of the first to third content keys, and outputs the decrypted content to the playback unit 238.

The playback unit 238 plays the content 151 following the selected playback path (step S113).

The playback unit 238 then plays the next decrypted content received from the decryption unit 237.

Third Embodiment

The following describes a third embodiment of the present invention with use of the drawings.

<Overview>

FIG. 14 is a schematic drawing of a content playback system 300 of the third embodiment of the present invention.

A BD player 332 is a content playback apparatus that plays content stored on a BD-ROM or an SD card. The BD player 332 includes a function of performing radio communication with a radio frequency tag.

A package 301 is composed of a BD-ROM 302, which is a medium on which content is stored, a box 303 in which the BD-ROM 302 is stored, and a radio frequency tag 304 that is an authentication device attached to the box 303.

The radio frequency tag 304 performs radio communication with the BD player 332.

The content recorded on the BD-ROM 302 is stream information that is a data stream of audio and video of the movie called "Galaxy Wars, Part 1."

A package 311 is composed of a BD-ROM 312, a box 313 that stores the BD-ROM 312, and a radio frequency tag 314 that is attached to the box 313.

The radio frequency tag 314 performs radio communication with the BD player 332.

The BD-ROM 312 stores stream information of a data stream relating to audio and video of the movie of the title "Galaxy Wars: Part 2", which is the sequel to "Galaxy Wars: Part 1" recorded on the BD-ROM 302.

A package 321 is composed of a BD-ROM 322, a box 323 that stores the BD-ROM 322, and a radio frequency tag 324 that is attached to the box 323.

The radio frequency tag 324 performs radio communication with the BD player 332.

The BD-ROM 322 stores stream information of a data stream relating to audio and video of the movie of the title "Galaxy Wars: Part 3", which is the sequel to "Galaxy Wars: Part 2".

Here, it is assumed that a user of the BD player 332 already possesses the packages 301, 311 and 321.

In order to have the BD player 332 play the content recorded in either the package 301, 311, or 321, the user inserts the one of the BD-ROMs 302, 312 and 322 that stores the content that the user wishes to play into a predetermined BD-ROM slot of the BD player 332.

The BD player 332 reads and plays content recorded on the inserted BD-ROM.

Furthermore, the user transmits user instructions to the BD player 332 with use of a remote control 333 by pressing operation keys such as a fast forward key, a rewind key, and a stop key.

On receiving a user instruction, the BD player 332 performs control relating to content playback, such as fast forwarding, rewinding, and stopping, according to the user instruction.

The SD card 331 is a recording medium on which content is recorded, and is distributed to the user separately to the package 301, 311 or 321.

The SD card 331 is connected to the BD player 332 by being mounted in a predetermined SD card slot therein.

The SD card 331 stores three contents: content 341, content 342, and content 343.

Here, each of the contents 341 to 343 is data stream information that is a data stream of audio and video of a movie.

<Structure>

Figure 15:
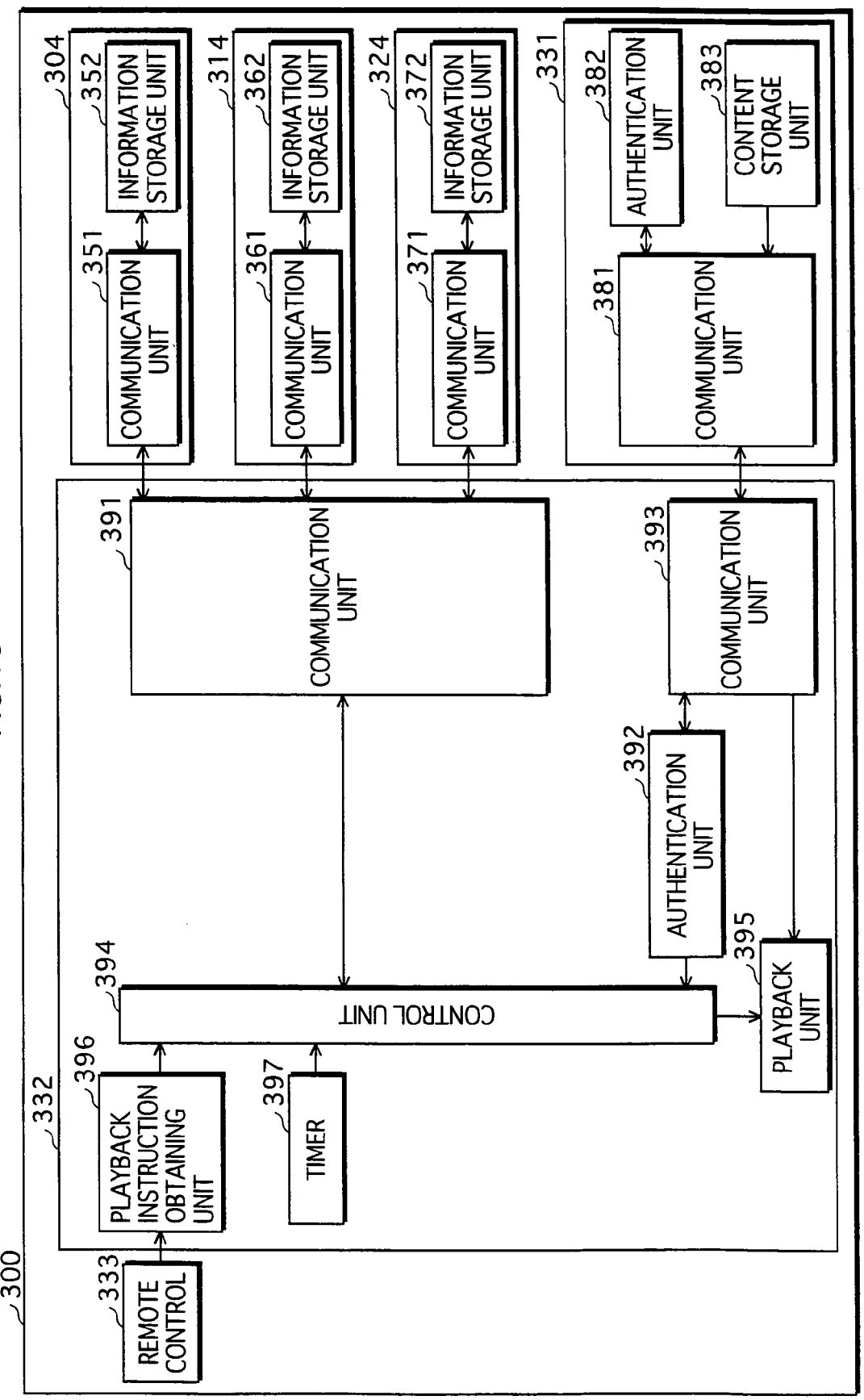
FIG. 15 is a block diagram showing the structure of the content playback system of the third embodiment.

FIG. 15 is a block diagram showing the structure of the content playback system 300 that is the third embodiment of the present invention.

<Radio Frequency Tag 304, Radio Frequency Tag 314, and Radio Frequency Tag 324>

Specifically, each of the radio frequency tags 304, 314 and 324 is a module composed of an IC that has the function of performing radio communication, an antenna, and a small-capacity storage area.

As shown in FIG. 15, in terms of function, the radio frequency tag 304 includes a communication unit 351 and an information storage unit 352.

The communication unit 351 performs radio communication with the BD player 332.

The information storage unit 352 stores a medium designation identifier that identifies an SD card whose use is anticipated.

The value of the medium designation identifier stored by the information storage unit 352 is "3".

The information storage unit 352 transmits the medium designation identifier to the BD player 332 via the communication unit 351.

The radio frequency tags 314 and 324 have the same structure as the radio frequency tag 304.

The value of the medium designation identifier stored in the information storage unit 362 is "1".

The value of the medium designation identifier stored in the information storage unit 372 is "3".

<SD Card 331>

The SD card 331 includes a communication unit 381, an authentication unit 382, and a content storage unit 383.

SD cards are each assigned a medium identifier for identifying the medium.

In this example, the value of the medium identifier of the SD card 331 is set as "3".

The authentication unit 382 stores the medium identifier.

The communication unit 381 performs communication of information with the BD player 332.

The authentication unit 382 performs authentication processing with the BD player 332 via the communication unit 381.

In this example, challenge-response authentication is used in the authentication processing.

The following describes the challenge and response authentication.

The BD player 332 and the authentication unit 382 store a parent password in advance.

The BD player 332 generates a random number, and transmits the random number to the authentication unit 382.

The authentication unit 382 calculates a child password that is a hash value of information that consists the parent password and the random number, and transmits the child password to the BD player 332.

The BD player 332 calculates a hash value of information that consists of the parent password and the random number, and when the calculated hash value matches the child password transmitted by the authentication unit 382, judges that the result of authentication is legal. Furthermore, when the calculated hash value does not match the child password, the authentication result is illegal.

The authentication unit 382 transmits the medium identifier to the BD player during authentication processing.

The content storage unit 383 stores the content 341, the content 342, and the content 343.

The information stored in the content storage unit 383 is read by the BD player 332 via the communication unit 381.

<BD Player 332>

The communication unit 391 performs radio communication with the radio frequency tag 304, the radio frequency tag 314, and the radio frequency tag 324.

The authentication unit 392 performs challenge-response authentication processing with the authentication 382 via the communication unit 393 and the communication unit 381.

The authentication unit 392 outputs the result of the authentication processing to the control unit 394.

The control unit 394 obtains the authentication result from the authentication unit 392.

The authentication unit 392 obtains the medium identifier held by the authentication unit 392 from the authentication unit 382 during authentication.

When the authentication result is legal, the control unit 394 plays the content stored on the SD card 331, based on a stored content playback control table.

FIG. 16 shows the content of the content playback control table.

The content playback control table indicates correspondence between "match counts" and content that is to be played. Each match count indicates a count of received medium identifiers that match a medium identifier of a medium storing content.

For example, in the present embodiment, since the value of the medium identifier read from the SD card 331 is "3", the value of the medium designation identifier obtained from the radio frequency tag 304 is "3", the value of the medium designation identifier obtained from the radio frequency tag 314 is "1", and the value of the medium designation identifier obtained from the radio frequency tag 334 is "3", the match count is 2.

Consequently, following the content playback control table, the control unit 394 judges that the content 324 is to be played.

The control unit 394 notifies the playback unit 395 of the content to be played back that was selected in accordance with the content playback control table.

The playback unit 395 plays the content 342, which is the content to be played back in accordance with the notification from the control unit 394.

A playback request obtaining unit 396 obtains the user instruction from the remote control 333, and outputs the obtained user instruction to the control unit 394.

The timer 397 includes a clock and a counter. A timeout value that is a multiple of 1 second is set by the control unit 394 in the counter.

The timer 397 counts down from the time out value, subtracting "1" every one second.

<Operations>

The following describes operations in content playback processing in the content playback system 300, with reference to FIG. 17.

FIG. 17 is a flowchart showing content playback processing in the content playback system 300.

The user inserts the SD card 331 into the SD slot in the BD player 332 (step S201).

The BD player 332 and the SD card 331 are electrically connected.

The user places the radio frequency tags 304, 314 and 324 such that they are in a range in which radio communication with the BD player 332 is possible.

The control unit 394 sets a value "5" in the timer 397, indicating five seconds as the timeout value (step S202).

The timer 397 counts down from the set value, subtracting "1" every second.

The control unit 394 judges whether the present value in the timer 397 is a value "0" that expresses timeout (step S203).

If the timer 397 indicates timeout, the processing proceeds to step S207.

If the timer 397 does not indicate timeout, the BD player 332 attempts to detect a radio frequency tag whose medium designation identifier has not been notified, with the intention of communicating with the detected radio frequency tag (step S204).

When such a radio frequency tag is not detected at step S204, the processing returns to step S203.

When such a radio frequency tag is detected at step S204, the BD player 332 obtains the medium designation identifier from the detected radio frequency tag (step S205).

The BD player 332 judges whether or not it has communicated with all radio frequency tags with which it was intending to communicate (step S206).

If the BD player 332 judges at step S206 that communication has not finished, the processing returns to step S203.

If the BD player judges at step S206 that communication has finished, the control unit 394 notifies the timer 397 of the end of timeout detection (step S207).

The timer 397 ends timeout detection processing, and clears the counted value.

The control unit 394 selects the content to be played, based on the content playback control table (step S208).

The playback unit 395 plays the content selected at step S208 (step S209).

<Modifications>

The content playback system of the present invention is not limited to the described embodiments. Various modifications may be made in a range that does not deviate from the scope of the present invention.

(1) In the second and third embodiments, a radio frequency tag is used as the medium that performs authentication, and BD-ROMs and SD cards are used as the media which store the content. However, the media are not limited to these, and may be media and/or apparatuses having equivalent functions, such as any of an MO, a DVD, a DVD-ROM, a DVD-RAM, a semiconductor memory, or an IC card, or a mobile telephone or a PDA in which is mounted an LSI having an authentication function.

The content playback apparatus that performs authentication is not limited to being a BD player, but may be any apparatus having equivalent functions, such as a DVD player, a personal computer, a video deck, or a home server that includes an HDD.

(2) Although the challenge-response authentication is described as being used in the second and third embodiments, any authentication method may be used as long as authentication can be performed.

Examples of other authentication methods are one time password authentication, and authentication using a digital signature.

Furthermore, examples of secure authentication methods includes a method using PKI, a method using media key obtaining means used in CPRM for DVD-RAM, and a media key obtaining method with mutual authentication used in CPRM for SD.

Furthermore, instead of mutual authentication, authentication processing may be performed by one side only.

The following is a possible structure in the second embodiment: the radio frequency tag-side transmits a tag identifier that identifies the radio frequency tag, and the BD player-side stores, in advance, an authentication identifier identifying a radio frequency tag to be authenticated. The result of authentication is legal if the tag identifier and the authentication identifier match.

(3) If the content playback apparatus performs playback control based on authentication processing, it is unnecessary for the content and other information stored on the SD card or the like to be stored in an encrypted state.

(4) In the second embodiment, when the SD card stores one content, the content may be played if the authentication results of both the radio frequency tag 104 and the radio frequency tag 114 are legal.

(5) Although the content 151 is always played in the second embodiment, a structure is possible in which the content 151 is not played.

Furthermore, the playback permission judgment table in the BD player may be used for other control according to the combinations of a plurality of authentication processing results.

For example, the playback permission table judgment table may store, in correspondence, combinations of authentication processing results, and processing to be executed following user instructions such as rewind, fast forward, and stop.

With such a structure, the instruction that the user is able to give the BD player using the remote control varies according to the combinations of the authentication processing result.

(6) The number of contents selected for playback with respect to each combination of authentication results is not limited to one, but may be two or more contents that are played one after the other.

Furthermore, instead of no content being played when all the authentication results are illegal, other content may be played in this case.

(7) Although the correspondence between the match count judged by the BD player and the instructed content is one-to-one in the third embodiment, it is not limited to being so.

For example, the content 343 may be played if the match count is two or greater. Furthermore, the contents 342 and 343 may be played if the match count is two.

(8) The authentication media and the media on which the contents are recorded are not limited to being separate structures.

For example, the authentication processing by the radio frequency tag 114 in the second embodiment may be performed by the SD card 121, and the radio frequency tag 114 omitted.

(9) The present invention is a content playback apparatus for playing content, based on authentication results, the content playback apparatus including: an authentication unit operable to perform first device authentication with a first authentication device, and perform second device authentication with a second authentication device; a determination unit operable to determine a content playback method based on an authentication result combination of the first and second authentications; and a playback unit operable to play content stored in a content storage medium, based on the determined playback method.

Furthermore, the determination unit may further determines that content playback is prohibited, when both the first device authentication and the second device authentication result in failure, and the playback unit may prohibits playback of the content when content playback is determined to be prohibited.

Furthermore, the playback method may include a playback range of a plurality of contents and a playback order of each playback range, and the playback apparatus may play the content based on the determined playback range of the plurality of contents and the playback order of each playback range.

Furthermore, the present invention is a content playback apparatus for playing content based on authentication results, the content playback apparatus including: an authentication unit operable to perform first authentication based on first information obtained from a first recording medium, and perform second authentication based on second information obtained from a second recording medium; a determination unit operable to determine a playback method based on a combination of authentication results of the first and second authentications; and a playback unit operable to play content stored in a content storage medium, based on the determined playback method.

Furthermore, the content may be an encrypted digital work, the first information may include a first encryption key, and the second information includes a second encryption key. The content playback apparatus may further include a decryption unit operable to generate a content key from the first encryption key and the second encryption key, and decrypt the encrypted digital work with use of the content key. Further, the playback unit may play the decrypted digital work based on the determined playback method.

Furthermore, the present invention is a playback apparatus, including: an obtaining unit operable to obtain first medium designation information from a first recording medium, and obtain medium designation information from a second recording medium; a read unit operable to read at least one piece of medium identification information from at least one content recording medium; a determination unit operable to determine a content playback method based on how many pieces of the recording medium information match the medium designation information; and a playback unit operable to play content stored on the content storage medium, based on the determined content playback method.

Furthermore, the present invention is a playback method for playing content stored on a content storage medium, based on authentication results, the playback method including: an authentication step of performing first device authentication with a first authentication device, and performing second device authentication with a second authentication device; a determination step of determining a content playback method based on an authentication result combination of the first and second authentications; and a playback step of playing content stored in a content storage medium, based on the determined playback method.

Furthermore, the present invention is a program applied to a content playback apparatus for playing content stored on a content storage medium, based on authentication results. The program causing a computer to execute a method including: an authentication step of performing first device authentication with a first authentication device, and performing second device authentication with a second authentication device; a determination step of determining a content playback method based on an authentication result combination of the first and second authentications; and a playback step of playing content stored in a content storage medium, based on the determined playback method.

Furthermore, the present invention is a content playback system including: a content playback apparatus for playing content, based on authentication results; first and second authentication devices for performing device authentication with the content playback apparatus; and a recording medium on which content is stored. The content playback apparatus including: an authentication unit operable to perform first mutual device authentication with the first authentication device, and perform second mutual device authentication with the second authentication device; a determination unit operable to determine a content playback method based on an authentication result combination of the first and second device authentications; and a playback unit operable to play content stored in the content storage medium, based on the determined playback method.

The present invention may be methods shown by the above. Furthermore, the methods may be a computer program realized by a computer, and may be a digital signal of the computer program.

Furthermore, the present invention may be a computer-readable recording medium apparatus such as a flexible disc, a hard disc, a CD-ROM, an MO, a DVD, a DVD-ROM, a DVD RAM, a BD (Blu-Ray Disc), or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on a electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A content playback apparatus comprising:
   a key storage unit operable to store a device key pre-assigned to said content playback apparatus;
   an information reading unit operable to read, from a recording medium having a pre-assigned media key and pre-storing main content, (i) key management information obtained by encrypting, based on the device key, one of (a) the media key and (b) a piece of revocation information, the piece of revocation information indicating that said content playback apparatus has been revoked, and (ii) the main content;
   a sub-content obtaining unit operable to obtain encrypted sub-content, the encrypted sub-content being data generated by encrypting sub-content based on a content key, the sub-content being content relating to the main content recorded on the recording medium, and the content key being a key generated by applying a predetermined operation to key generation information based on the media key;
   a key obtaining unit operable to decrypt, based on the device key, the key management information to obtain one of (a) the media key and (b) the piece of revocation information;
   an information obtaining unit operable to obtain key generation information from an information source other than the recording medium;
   a key generation unit operable to, when said key obtaining unit has obtained the media-key, apply a predetermined operation to the obtained key generation information to generate a content key, the predetermined operation being applied to the obtained key generation information based on the media key;
   a decryption unit operable to decrypt the encrypted sub-content based on the content key; and
   a playback unit operable to play the main content and the decrypted sub-content.

2. The content playback apparatus of claim 1, wherein:
   the encrypted sub-content is recorded on an external recording medium, other than the recording medium, with a unit value unique to the sub-content;
   said key generation unit is operable to generate the content key by applying an operation on the key generation information using the unit value and the media key.

3. The content playback apparatus of claim 1, wherein:
   the encrypted sub-content is recorded on an external recording medium having a unique identifier;
   said information reading unit is operable to read the unique identifier from the external recording medium via an external reading apparatus;
   said content playback apparatus further comprises an authentication unit operable to perform authentication of the external reading apparatus and operable to receive the unique identifier from the external recording medium after the authentication of the external reading apparatus; and
   said playback unit performs plays the decrypted sub-content based on the received unique identifier.

4. The content playback apparatus of claim 1, wherein:
   the main content recorded on the recording medium is encrypted based on the media key;
   said decryption unit further decrypts the main content based on the media key; and
   said playback unit further plays the decrypted main content.

5. The content playback apparatus of claim 1, wherein the sub-content is content played simultaneously with the main content being played.

6. The content playback apparatus of claim 1, wherein said information obtaining unit is operable to acquire the encrypted sub-content from the information source other than the recording medium.

7. The content playback apparatus of claim 6, wherein:
   the key management information is a list including at least one of (i) a plurality of encrypted media keys or (ii) a plurality of encrypted pieces of revocation information;
   each of the encrypted media keys and each of the encrypted pieces of revocation information are generated by encrypting the media key or the piece of revocation information-using a different one of the device key and an equivalent thereof; and
   said key obtaining unit decrypts a decryption target in the list, the decryption target being (i) an encrypted media key or an encrypted piece of revocation information and (ii) encrypted using the device key stored in said key storage unit.

8. The content playback apparatus of claim 6, wherein:
   the key management information is a list including encrypted media keys generated by encrypting the media key using respective valid keys;
   said key storage unit stores a plurality of keys; and
   when one of the plurality of keys stored in said storage unit matches one of the valid keys, said key obtaining unit considers the key matching one of the valid keys to be the device key.

9. The content playback apparatus of claim 6, wherein:
   the key generation information is an encrypted content key generated by encrypting the content key using the media key; and
   said key generation unit generates the content key by decrypting the obtained key generation information using the media key.

10. The content playback apparatus of claim 6, wherein:
    the key generation information is (i) arbitrary data of a predetermined length and (ii) in correspondence with the encrypted sub-content;
    the content key is obtained by subjecting the key generation information to one-way function processing according to a predetermined encryption method based on the media key; and
    said key generation unit (i) subjects the key generation information to one-way function processing based on the predetermined method based on the media key and (ii) treats data resulting from the one-way function processing as the content key.

11. The content playback apparatus of claim 10, wherein:
the content key is an exclusive OR of the key generation information and encrypted key generation information generated by encrypting the key generation information based on the predetermined encryption method based on the media key; and
said key generation unit includes:
an encryption sub-unit operable to encrypt the key generation information based on the predetermined encryption method based on the media key; and
a calculation sub-unit operable to calculate the exclusive OR of the key generation information and the encrypted key generation information and treat the data resulting from the calculated exclusive OR as the content key.

12. The content playback apparatus of claim 11, wherein:
the predetermined encryption method is an AES encryption method; and
said encryption sub-unit encrypts the key generation information according to the AES encryption method based on the media key.

13. The content playback apparatus of claim 6, wherein said information obtaining unit obtains the encrypted sub-content and the key generation information via a network.

14. The content playback apparatus of claim 6, wherein said information obtaining unit obtains the encrypted sub-content and the key generation information from a dependent recording medium that is separate from the recording medium.

15. The content playback apparatus of claims 6, wherein:
the encrypted sub-content is generated by encrypting content using a block encryption method based on the content key; and
said decryption unit decrypts the encrypted sub-content using the block encryption method based on the content key.

16. The content playback apparatus of claim 15, wherein:
the encrypted sub-content is generated by encrypting the sub-content using a DES encryption method based on the content key; and
said decryption unit decrypts the encrypted sub-content using the DES encryption method based on the content key.

17. The content playback apparatus of claim 15, wherein:
the encrypted sub-content is generated by encrypting the sub-content using an AES encryption method based on the content key; and
said decryption unit decrypts the encrypted sub-content using the AES encryption based on the content key.

18. The content playback apparatus of claim 6, wherein, if said key obtaining unit obtains the revocation information, then said decryption unit does not decrypt the encrypted sub-content.

19. A content playback method used in a content playback apparatus, said content playback method comprising:
storing a device key pre-assigned to the content playback apparatus;
reading, from a recording medium having a pre-assigned media key and pre-storing main content unit, (i) key management information obtained by encrypting, based on the device key, one of (a) the media key and (b) a piece of revocation information, the piece of revocation information indicating that the content playback apparatus has been revoked, and (ii) the main content;
obtaining encrypted sub-content, the encrypted sub-content being data generated by encrypting sub-content based on a content key, the sub-content being content relating to the main content recorded on the recording medium, and the content key being a key generated by applying a predetermined operation to key generation information based on the media key;
decrypting, based on the device key, the key management information to obtain one of (a) the media key and (b) the piece of revocation information;
obtaining the key generation information from an information source other than the recording medium;
when said obtaining of the key generation information obtains the media key, applying a predetermined operation to the obtained key generation information to generate a content key, the predetermined operation being applied to the obtained key generation information based on the media key;
decrypting the encrypted sub-content based on the content key; and
playing the main content and the decrypted sub-content.

20. A computer-readable recording medium having a computer program recorded thereon, the computer program for causing a content playback apparatus to obtain encrypted content, decrypt the obtained encrypted content, and play the decrypted content, the computer program causing a computer to execute a method comprising:
storing a device key pre-assigned to the content playback apparatus;
reading, from a recording medium having a pre-assigned media key and pre-storing main content, (i) key management information obtained by encrypting, based on the device key, one of (a) the media key and (b) a piece of revocation information, the piece of revocation information indicating that the content playback apparatus has been revoked, and (ii) the main content;
obtaining encrypted sub-content, the encrypted sub-content being data generated by encrypting sub-content based on a content key, the sub-content being content relating to the main content recorded on the recording medium, and the content key being a key generated by applying a predetermined operation to key generation information based on the media key;
decrypting, based on the device key, the key management information to obtain one of (a) the media key and (b) the piece of revocation information;
obtaining the key generation information from an information source other than the recording medium;
when said obtaining of the key generation information obtains the media key, applying a predetermined operation to the obtained key generation information to generate content key, the predetermined operation being applied to the obtained key generation information based on the media key;
decrypting the encrypted sub-content based on the content key; and
playing the main content and the decrypted sub-content.

* * * * *